(12) United States Patent
Matsuura et al.

(10) Patent No.: US 6,629,733 B2
(45) Date of Patent: Oct. 7, 2003

(54) RECLINING DEVICE

(75) Inventors: Hiroshi Matsuura, Kosai (JP); Tetsuya Ohba, Kosai (JP); Yasushi Asano, Kosai (JP)

(73) Assignee: Fujikiko Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 09/896,024

(22) Filed: Jun. 29, 2001

(65) Prior Publication Data

US 2002/0000746 A1 Jan. 3, 2002

(30) Foreign Application Priority Data

Jun. 29, 2000 (JP) .................... P2000-196755
Jun. 29, 2000 (JP) .................... P2000-196759
Jun. 29, 2000 (JP) .................... P2000-196837
Jun. 29, 2000 (JP) .................... P2000-196857

(51) Int. Cl.$^7$ ............................................. B60N 2/02
(52) U.S. Cl. ............ 297/366; 297/216.1; 297/378.11; 297/362
(58) Field of Search ................. 297/366, 367, 297/368, 216.1, 378.11, 378.12, 362, 463.1, 463.2

(56) References Cited

U.S. PATENT DOCUMENTS

| | | | | |
|---|---|---|---|---|
| 4,187,579 A | * | 2/1980 | Gensicke | ............ 16/354 |
| 5,002,339 A | * | 3/1991 | Yamashita et al. | ...... 297/354.12 |
| 5,098,359 A | * | 3/1992 | Chales et al. | ............ 475/347 |
| 5,104,190 A | * | 4/1992 | Siegrist | ............ 297/362 |
| 5,333,932 A | * | 8/1994 | Satoh et al. | ............ 297/362 |
| 5,622,407 A | * | 4/1997 | Yamada et al. | ............ 297/366 |
| 6,024,410 A | * | 2/2000 | Yoshida | ............ 297/301.1 |
| 6,095,608 A | * | 8/2000 | Ganot et al. | ............ 297/367 |
| 6,112,370 A | * | 9/2000 | Blanchard et al. | ............ 16/325 |
| 6,149,235 A | * | 11/2000 | Fahim | ............ 297/259.2 |
| 6,164,720 A | * | 12/2000 | Haglund | ............ 297/216.1 |
| 6,312,053 B1 | * | 11/2001 | Magyar | ............ 297/367 |
| 6,332,649 B1 | * | 12/2001 | Vossmann | ............ 297/366 |
| 2002/0185903 A1 | * | 12/2002 | Hosokawa | ............ 297/362 |

FOREIGN PATENT DOCUMENTS

| | | |
|---|---|---|
| FR | 2463596 | 2/1981 |
| FR | 01-104201 | 4/1989 |
| JP | 08-019444 | 1/1996 |

* cited by examiner

Primary Examiner—Peter M. Cuomo
Assistant Examiner—Erika Garrett
(74) Attorney, Agent, or Firm—Kilpatrick Stockton LLP

(57) ABSTRACT

A frame has a pivot protruding therefrom. A first gear is rotatable relative to the frame. A cam is rotatable with the first gear. A second gear is between the pivot and the cam. The second gear is engaged with the cam for rotation. The second gear is to be rotated on the pivot, thus to be locked with the first gear. The pivot has smaller mechanical strength than the first gear and the second gear.

11 Claims, 26 Drawing Sheets

RECLINING DEVICE

BACKGROUND OF THE INVENTION

1. Field of the Invention

The present invention relates to a reclining device which allows a seat back to be rotated about a seat cushion, and, more specially, to one served for a seat of a vehicle, such as an automobile.

2. Description of Relevant Art

Conventionally this kind of a seat recliner has been known with the following constitution. The seat recliner includes: a frame mounted to the base plate of a seat cushion; and a lid mounted to an arm plate of a seat back, the frame and the lid a being rotatable relative to each other. The engagement of a locking gear pivotably mounted on the frame and an internal gear formed in an inner circumferential face of the lid with each other prevents the frame and the lid from their relative rotation. The rotation of a operation shaft through the frame and the lid causes the shifting of the locking gear via a cam plate, the disengagement of the locking gear and the internal gear from each other, and the completion of disengagement to allow relative rotation.

SUMMARY OF THE INVENTION

Improvements in vehicle safety are increasingly in demand. The improvement of the locking strength of seat recliner in vehicles is also sought.

The improvement of locking strength, however, is conventionally achieved by means of thickening the base plate or increasing the numbers of engagement teeth. The former results in low formability and high manufacture cost, while the latter is sometimes difficult to adopt due to the limitation of a layout for a large-sized recliner.

The outer circumferential face of the lid is located along the inner circumferential face of the circular recess formed to the frame. The outer circumferential face and the recess have a clearance therebetween, considering product variation.

The clearance causes the engagement of the locking gear and the internal gear of the lid with each other, and the occurrence of a looseness of the seat back without the looseness of the lock mechanism.

It therefore is an object of the present invention to provide a reclining device for a vehicle which has improved locking strength without remaining an increase in the number of engagement teeth or the thickening of a plate.

Another object is to provide a reclining device for a vehicle which minimizes the looseness between the recess of a frame and an outer circumferential face of a lid effectively even if product variation occurs.

To achieve the objects, a first aspect of the invention provides the following reclining device. A frame has a pivot protruding therefrom. The frame is fixed to a first seat component. A first gear is rotatable relative to the frame. The first gear is fixed to a second seat component for establishing an angle between the first seat component and the second seat component. A cam is rotatable to the first gear and with an input component. A second gear is between the pivot and the cam. The second gear is engaged with the cam for rotation. The second gear is to be rotated on the pivot, thus to be locked with the first gear. The pivot has smaller mechanical strength than the first gear and the second gear.

Preferably, the frame has a first guide protruding therefrom. The first guide engages with a periphery of the second gear for guiding the second gear to be rotated on the pivot. The first guide has smaller mechanical strength than the first gear and the second gear.

Preferably, the second gear has a rotational center inside and in proximity to a first tooth of the first gear.

A second aspect of the invention provides the following reclining device. A frame has a pivot protruding therefrom. The frame is fixed to a first seat component. A first gear is rotatable relative to the frame. The first gear being fixed to a second seat component for establishing an angle between the first seat component and the second seat component. A cam is rotatable to the first gear and with an input component. A second gear is between the pivot and the cam. The second gear is engaged with the cam for rotation. The second gear is to be rotated on the pivot, thus to be locked with the first gear. The second gear has a rotation center inside and in proximity to a first tooth of the first gear.

Preferably, the second gear has a second tooth formed close to the pivot.

Preferably, the second gear has a second tooth to be meshed with the first tooth. One of the first tooth and the second tooth has a pressure angle set at a range between 60 and 90 degrees.

Preferably, the second tooth has smaller whole depth in proximity to the rotation center than at another portion.

Preferably, the second tooth has a tip circle with greater radius in proximity to the rotation center than at another portion.

Preferably, the frame includes a first guide protruding therefrom. The first guide engages with a periphery of the second gear for guiding the second gear to be rotated on the pivot.

A third aspect of the invention provides the following reclining device. A frame has a pivot and a second guide each protruding therefrom. The frame is fixed to a first seat component. A first gear is rotatable relative to the frame. The first gear is fixed to a second seat component for establishing an angle between the first seat component and the second seat component. A cam is rotatable to the first gear and with an input component. A second gear is between the pivot and the cam. The second gear is engaged with the cam for rotation. The second gear has a second mating guide engaged with the second guide for guiding the second gear to be rotated on the pivot, thus to be locked with the first gear.

Preferably, the second mating guide includes an opening. The opening includes: a first arced part about the pivot as center; and first plane parts at both ends thereof, the first plane parts having the first arced part therebetween. The second guide includes a projection. The projection includes: a second arced part contacting the first arced part to be slid; and a second plane part to be brought in contact with a first plane part.

Preferably, the second mating guide is embossed as a recess at a central portion of a free end of the second gear.

Preferably, the frame includes a first guide protruding therefrom. The first guide engages with a periphery of the second gear for guiding the second gear to be rotated on the pivot.

A fourth aspect of the invention provides the following reclining device. A frame has a recess with a first circumferential face, and a pivot protruding from the recess. The frame is fixed to a first seat component. A first gear is rotatable relative to the frame. The first gear is fixed to a second seat component for establishing an angle between the first seat component and the second seat component. The first gear is inserted into the recess. The first gear has a second circumferential face facing to the first circumferential face. A cam is rotatable to the first gear and with an input component. A second gear is between the pivot and the cam. The second gear is engaged with the cam for rotation. The second gear is to be rotated about the pivot, to be locked with the first gear. A projection is between the frame and the second gear. The projection is located on one of the first circumferential face and the second circumferential face.

Preferably, the projection projects from the first circumferential face, with a inner diameter of the projection smaller than an outer diameter of the second gear.

Preferably, the projection projects from the second circumferential face, with an outer diameter of the projection greater than an inner diameter of the recess.

Preferably, the frame has smaller mechanical strength than the first gear.

Preferably, the recess has another recess formed at a corner thereof.

Preferably, a reclining device further includes a first lock mechanism for locking between the pivot and the first gear, when a force more than a predetermined value is applied to one of the frame and the first gear.

Preferably, the first locking mechanism further includes a first tooth formed to the first gear; and a first portion formed to the pivot and facing the first tooth. The first portion is deformed to mesh the first tooth.

Preferably, a reclining device further includes: a second lock mechanism for locking between the first guide and the first gear, when a force more than a predetermined value is applied to one of the frame and the first gear.

Preferably, the locking mechanism includes: a first tooth formed to the first gear; and a second portion formed to the first guide and facing the first tooth. The second portion is deformed to mesh the first tooth.

According to the first aspect of the invention, the pivot or the first guide is deformable radially outward. Thus, even if a load is applied to the first gear, the second gear crushes one of the pivot and the first guide. The crushed portion moves radially outward to mesh the first gear, thus preventing the movement of the first gear. This improves locking holding strength considerably.

The pivot is positioned inside and in proximity to the first gear, thus improving in strength. When one of pivot and the first guide is crushed, the crushed portion is facilitated to move radially outward, thus improving in locking strength.

According to the second aspect of the invention, the pivot increases in sectional area, and this improves locking strength and prevents looseness.

The second tooth close to the pivot increases in the number of tooth without the change of layout, thus improving locking strength.

The pressure angle, the whole depth, or the radius of the tip circle allows the smoothing of the engagement and the disengagement of the second gear and the prevention of the lowering of the contact ratio due to the variation of the tooth shapes.

According to the third aspect of the invention, the second gear is supported by the second guide. The second guide prevents the integral rotation of the first gear with the second gear in a locked state, thus enhancing locking strength considerably.

The second mating guide is provided at the central portion the free end of the second gear, thus achieving a reclining device with a high strength and a small size without the change of its conventional structure.

The opening and the projection allow their contact faces to be maximized at a limited range and a receiving face to be enlarged when a load is applied to the second gear, thus enhancing locking strength.

The embossed recess prevents the lowering of the strength of the second gear, thus allowing the prevention from the lowering of the locking strength.

According to the fourth aspect of the invention, the projection allows the effective minimization of the looseness between recess and the second circumferential face of the first gear even if the product variation between the frame and the first gear occurs. This prevents the occurrence of the looseness of a seat back in the locked state of a locking mechanism.

The first or second circumferential face is forced to be inserted into the outer circumferential face of the projection, and this effectively minimizes the looseness between recess and the second circumferential face of the first gear even if the product variation between the frame and the first gear occurs. This prevents the occurrence of the looseness of a seat back in the locked state of a locking mechanism.

The shaving of second gear with the frame causes the assembly of the frame and the second gear with each other, thus preventing the difficult rotation of the second gear relative to the frame.

The coming of the shaved portion into the another recess of frame prevents the axial slight movement of the second gear and the obstruction of the shaved portion to the rotation of second gear relative to the frame.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIG. 33 is an explanatory perspective view of a seat which a recliner of the invention is adapted to.

DETAILED DESCRIPTION OF THE PREFERRED EMBODIMENTS

Figure 1:
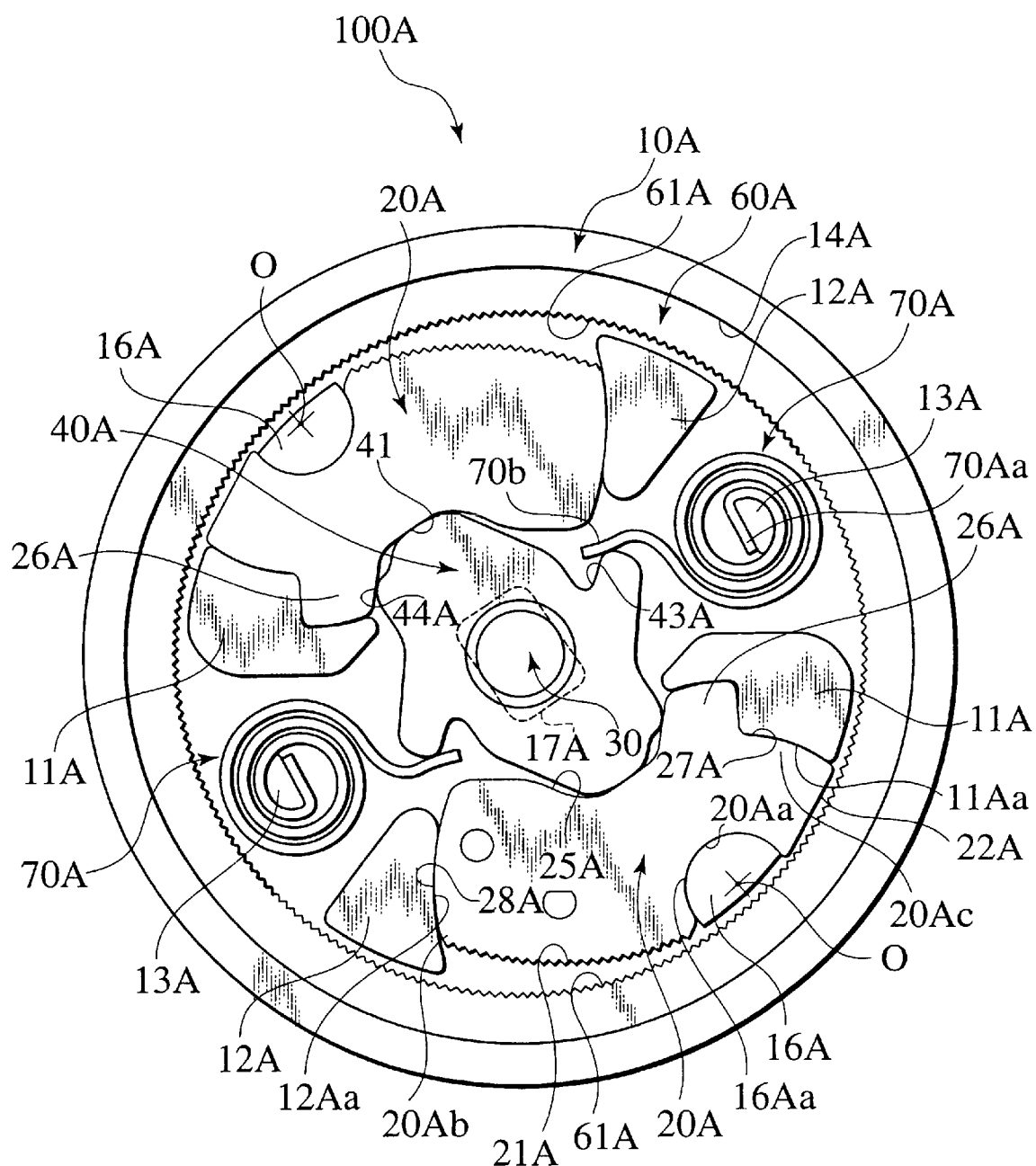
FIG. 1 is an explanatory front view showing a lock mechanism in a disengaged state according to the first embodiment of the invention.
Figure 2:
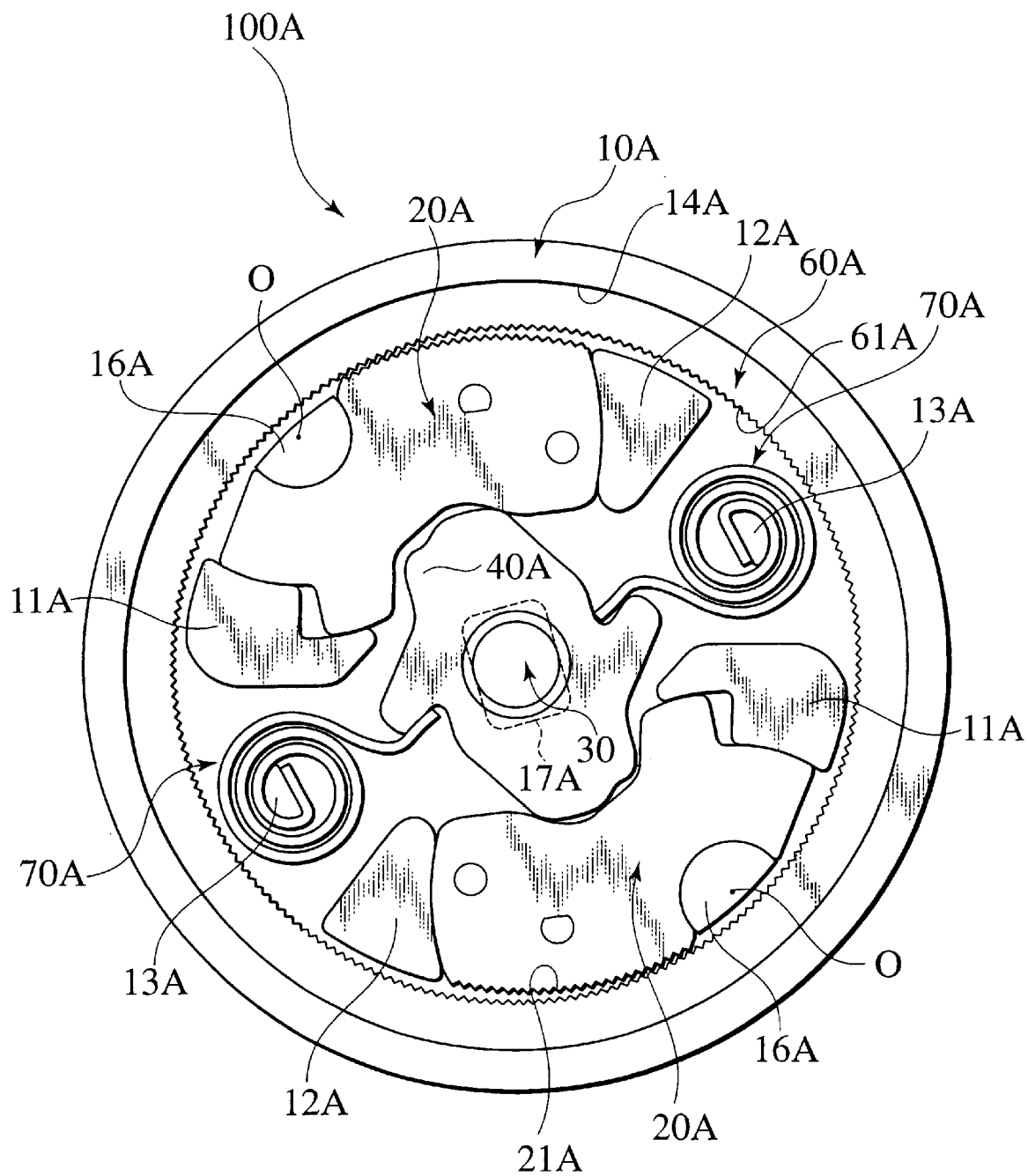
FIG. 2 is an explanatory front view showing a transfer process of a lock mechanism from a disengaged state to a locked state.

There will be detailed below the preferred embodiments of the present invention with reference to the accompanying drawings. Like members are designated by like reference characters.

First Embodiment

The embodiment is explained with reference to FIGS. 1 to 10. In the seat recliner E for a vehicle as shown in FIG. 1, lid 60A as a first gear is fitted in the inner side of circular recess 14A formed to frame 10A, to be rotated along the inner circumferential face of frame 10A. The engagement of locking gears 20A as a second gear, located in a regular arrangement in frame 10A, and internal gear 61A formed to the inner circumferential face of lid 60A, prevent the relative rotation of frame 10A and lid 60A. The rotation of operation shaft 30 through frame 10A and lid 60A causes the disengagement of locking gears 20A via cam plate 40A integral with operation shaft 30, the disengagement of locking gears 20A and internal gear 61A from each other, and the free relative rotation of frame 10A and lid 60A. These constitute lock mechanism 100A.

Pivots 16A each protrude integrally from frame 10A. Pivot 16A with the rotational center O of locking gear 20A therein and a pair of arced guide faces 11Aa and 12Aa allow locking gear 20A to be rotated about rotational center O. Each side of the free ends of the locking gears has tooth 21A formed thereon, which is to be engaged with internal gear 61A. The opposite side of the free end has cam face 25A formed thereon, allowing locking gear 20A to be rotated on pivot 16A. One part of the frame 10A and lid 60A combination is mounted to seat cushion 150, and the other part is mounted to seat back 160.

Frame 10A with pivot 16A and arced guide faces 11Aa and 12Aa has smaller mechanical strength than lid 60A formed with locking gear 20A and internal gear 61A, thus allowing pivot 16A and guide faces 11Aa and 12Aa to be deformed radially outward. In addition, rotation center O of locking gear 20A is set close to the inner side of internal gear 61A.

The following explains the above constitution in further detail.

Figure 9:
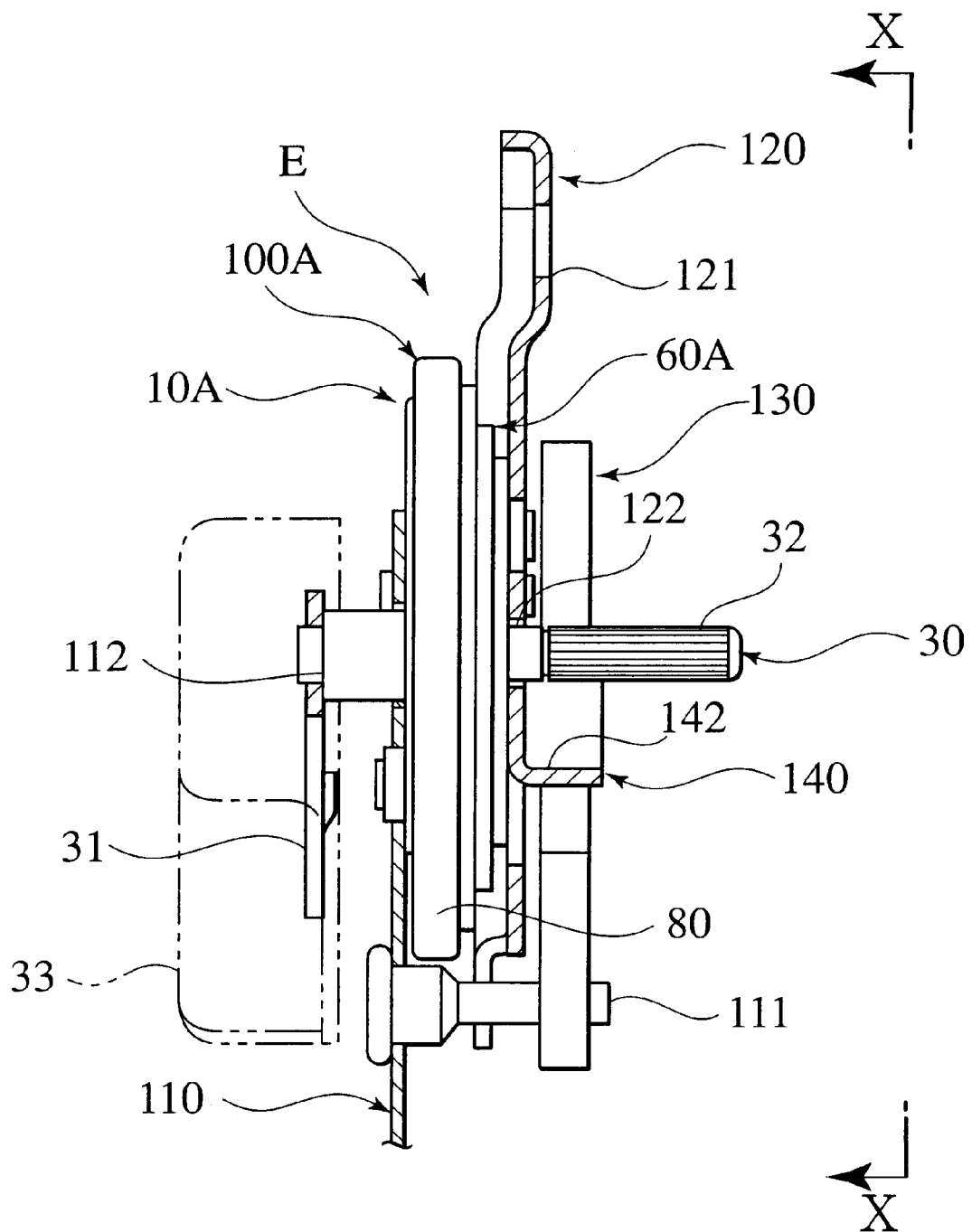
FIG. 9 is an explanatory sectional view taken along the line indicated by arrows of IX in FIG. 7.

The recliner E has frame 10A; lid 60A; locking gear 20A; operation rod 30; cam plate 40A; and lock spring 70A, to constitute lock mechanism 100. As shown in FIG. 9, base plate 110, attached to a seat cushion 150, is mounted on the outer side of base plate 110. Arm plate 120, attached to seat back 160, is mounted on the outer side of lid 60A. In addition, a helical (conical) spring 130, biasing against arm plate 120 in the front direction of F, is assembled.

Frame 10A is formed as a disc, with concentric circular recess 14A formed within it and close to its outer circumferential face.

Lid 60A is formed as a disc, with its outer circumferential face fitted into circular recess 14A of frame 10A, thus being inserted into recess 14A for rotation. Lid 60A has concentric internal gear 61A on the inner circumferential face thereof. Lid 60A and frame 10A are covered with annular cover 80 (see FIG. 7) to hold their outer circumferences, thus being supported for relative rotation.

Locking gears 20A are slidably held between the bottom face of recess 14A of frame 10A and the inner face of lid 60A, with at least one, for example, two or three being in radial arrangement (the embodiment has the arrangement of two opposite each other), thus being rotatably mounted to pivot 16A protruding from the bottom face of recess 14A of frame 10A. The outer circumferential faces of pivots 16A facing to internal gear 61A are cut flat so as not to engage with internal gear 61A.

At each one side (at internal gear 61A) of free ends 20Ab of locking gears 20A, arced gear, i.e. external gear 21A with a radius identical to internal gear 61A is formed thereon to engage with internal gear 61A. The opposite side of free end 20Ab has cam face 25A formed thereon, to be engaged with cam face 41A of cam plate 40A as will be described later. In addition, projections 26A for disengagement are each formed adjacent to cam face 25A and are to be engaged with disengagement face 44A of cam plate 40A, to be described later.

The end face at base 20Ac of locking gear 20A has arced contact face 27A about rotation center O of locking gear 20A as center formed thereon. This contact face 27A is set to be slidably contacted with arced guide face 11Aa of guide projection 11A formed to frame 10A. The end face at free end 20Ab of locking gear 20A has arced contact face 28A about rotation center O of locking gear 20A formed thereon. This contact face 28A is set to be slidably contacted with arced guide face 12Aa of guide projection 12A formed to frame 10A.

Thus, pivot 16A and two arced guide faces 11Aa and 12Aa allow locking gear 20A to be rotated about rotation center O of locking gear 20A in pivot 16A.

As described above, frame 10A with guide projections 11A and 12A each formed with pivot 16A and guide faces 11Aa and 12Aa has smaller mechanical strength than locking gears 20A and lid 60A formed with internal gear 61A, allowing the radial outwards deformation of pivot 16A and guide faces 11Aa and 12Aa.

Figure 4:
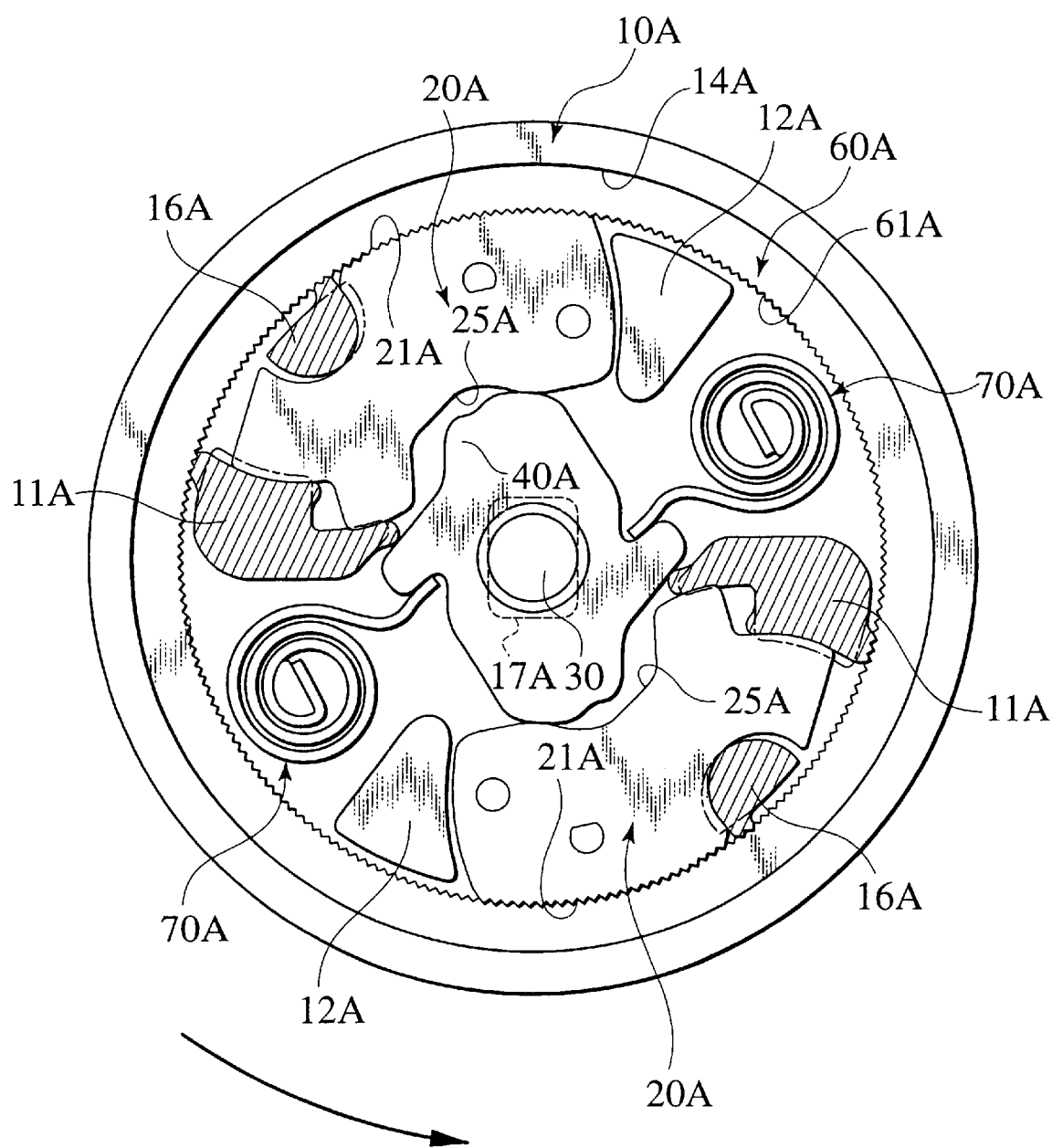
FIG. 4 is a front explanatory view showing a lock mechanism in a locked state when a large clockwise external force is applied to it.
Figure 5:
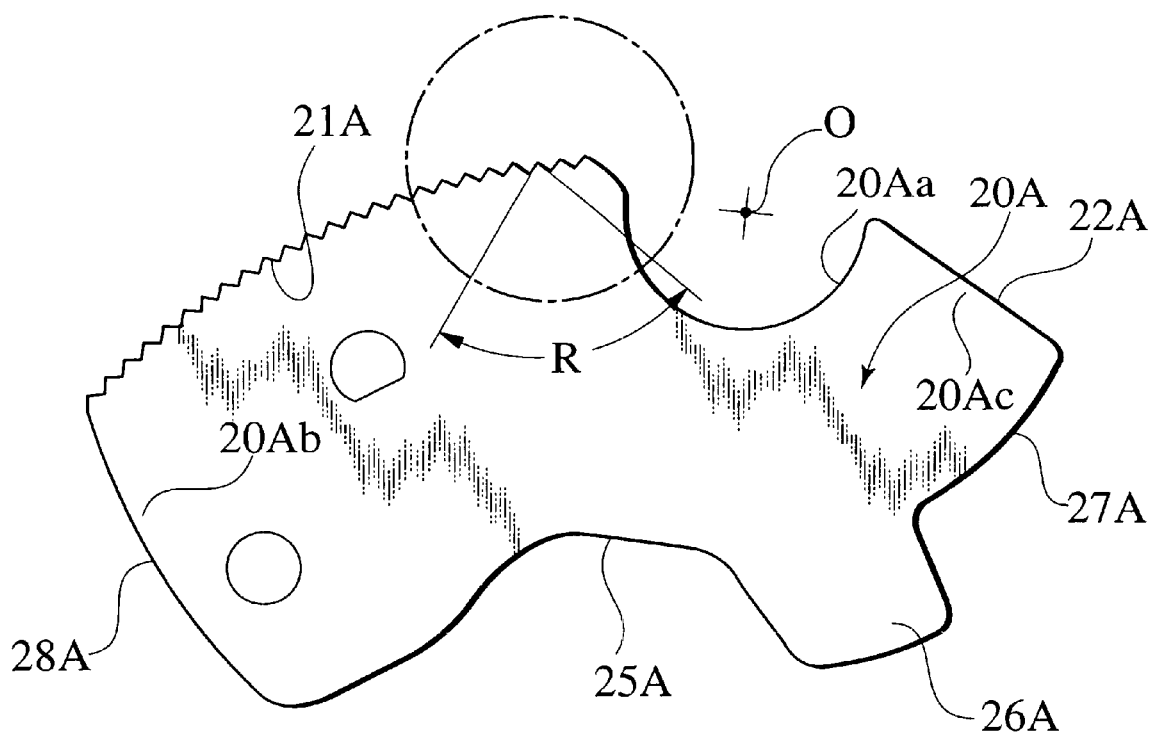
FIG. 5 is an enlarged explanatory front view showing locking gear of FIG. 1.

Thus, when a large external force is applied to lid 60A in lock state of the lock mechanism, as it shown in FIG. 4, each portion of pivots 16A and guide projections 11A or 12A, constituting guide faces 11Aa or 12Aa, which have moved radially outwards, is meshed with internal gear 61A, functioning to prevent the rotation of lid 60A, thus improving lock holding strength considerably and providing a highly reliable seat recliner in comparison with conventional ones.

The embodiment as shown in FIG. 4 illustrates that when a large external force is applied in a counterclockwise direction to lid 60A in a locked state of the lock mechanism, portions of one sides of pivots 16A and guide projections 11A constituting guide faces 11Aa, each move radially outwards to be meshed with internal gear 61A. However, when a large external force in a clockwise direction is applied to lid 60A in a locked state of the lock mechanism, portions of another sides of pivots 16A and guide projections 12A each constituting guide face 12Aa, each move radially outwards to be meshed with internal gear 61A.

Pivots 16A with rotation center O, as described before, each have the guide face 16Aa of more than 180 degrees, so that the rotation center O of locking gear 20A is set in proximity to the inner side of internal gear 61A. This improves the strength of pivots 16A as the guide faces for locking gears 20A to facilitate a portion of guide projection 11A or 12A constituting guide face 11Aa or 12Aa to be moved radially outwards. The resultant improvement in locking strength produces highly strengthened and compact seat recliner in comparison with conventional ones.

In the embodiment, each tooth 21A of locking gears 20A is formed close to pivot 16A, and the tooth numbers can be increased without the changing of the layout, thus improving locking strength.

Each pressure angle R of tooth 21A of locking gear 20A and the tooth of internal gear 61A is set at between 60 to 90 degrees. Thus, the engagement and disengagement of the locking gear is smooth, and lowered contact ratio resulting from variation of tooth shapes is avoided.

Figure 6:
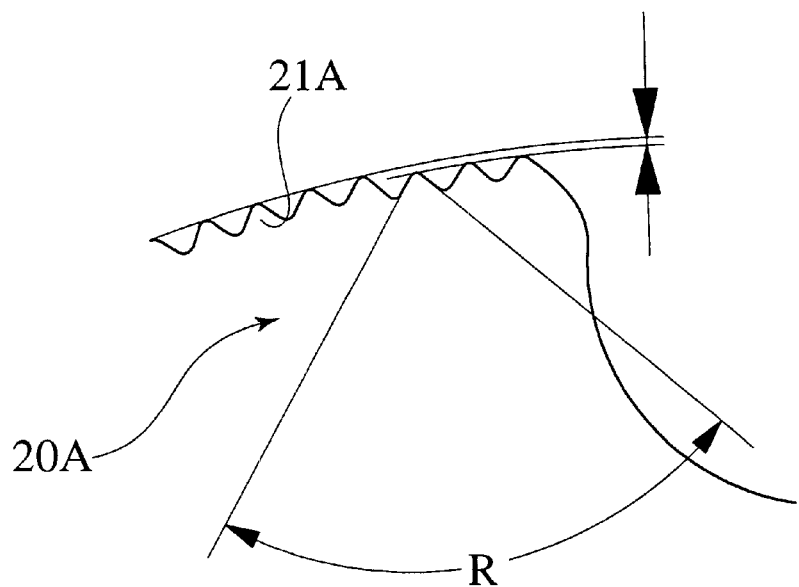
FIG. 6 is an explanatory enlarged front view showing a principal part of FIG. 5.
Figure 7:
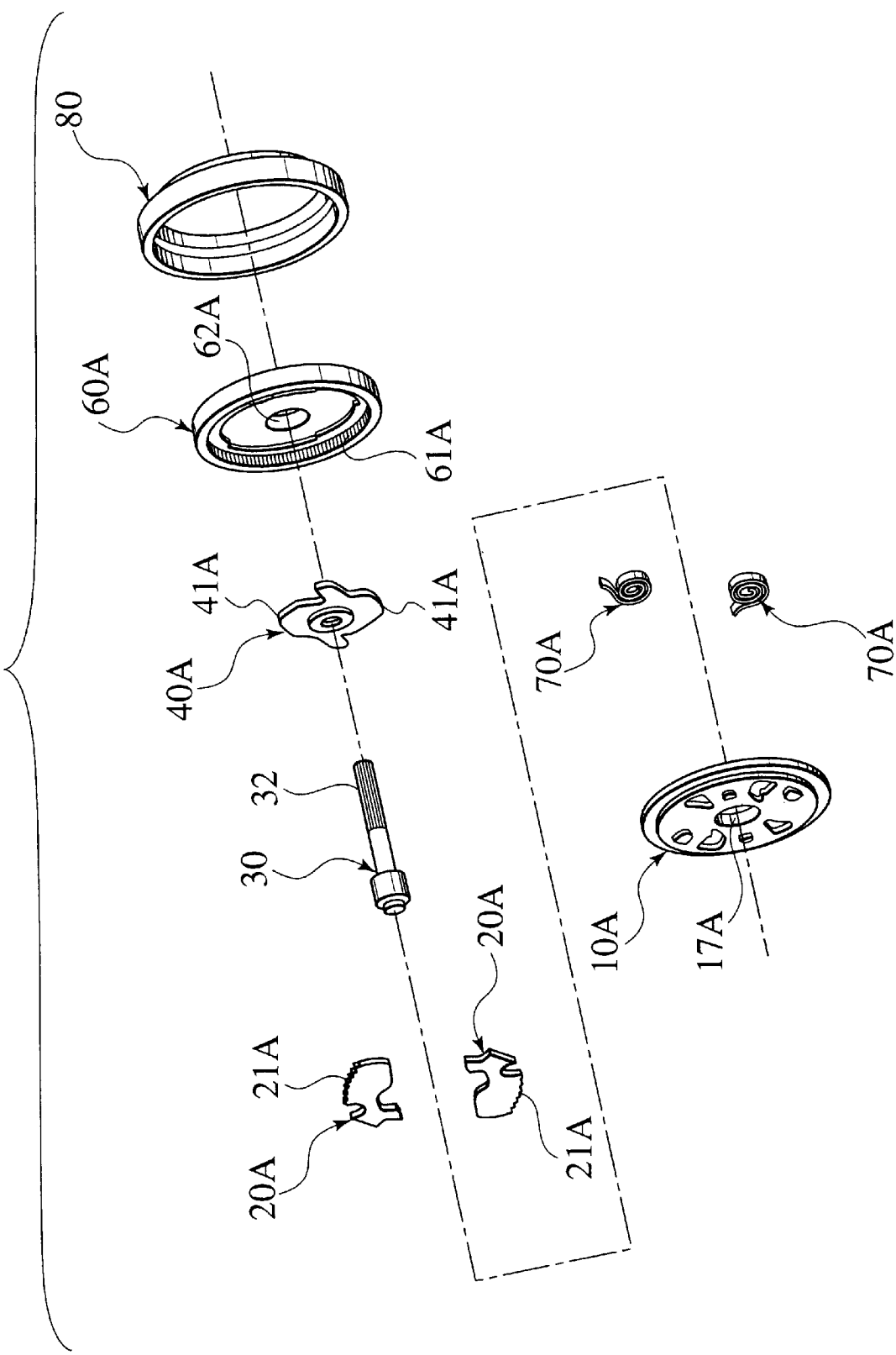
FIG. 7 is an explanatory exploded perspective explanatory view.

As shown in FIG. 6, the formation of teeth 21A of locking gear 20A with their whole depth from tip circle in proximity to a rotation center O smaller than other portions prevents any lowering of the contact ratio due to the variation of the tooth shapes, thus improving the locking strength. Though the embodiment is formed with three shallower teeth, the formation of at least a shallower tooth obtains the above-described benefit.

The formation of tooth 21A of lock 20A with a radius of its tip circle in proximity to the rotation center O being larger than at other portions prevents the lowering of the contact ratio due to the variation of the tooth shapes, thus improving the locking strength.

Operation pivot 30 is fitted with some play into through-holes 17A and 62A formed in the central portions of frame 10A and lid 60A respectively, which are in turn inserted with some play into support holes 112 and 122 formed base plate 110 and arm plate 120 respectively as shown FIG. 9. The portion projecting outwards from base plate 110 has operation lever 31 mounted thereto, while the portion projecting outward from arm plate 120 has spline 32 formed therewith for the lock connection of both sides. Operation lever 31 has operation knob 33 mounted thereto.

Cam plate 40A is pressed to the intermediate portion of operation rod 30 to be fixed, and has cam faces 41A and disengagement faces 44A formed on its outer circumference, which are to be engaged with cam faces 25A and disengagement projections 26A of locking gears 20A respectively.

Lock springs 70A are each formed as a helical spring, in the embodiment two springs being located in recess 14A of frame 10A. Bases 70Aa of lock springs 70A are mounted to two projections 13A respectively, each of which projects between guide projections 11A and 12A which have locking gear 20A therebetween. The outer ends 70Ab are locked with engagement portions 43A formed to cam plate 40A, respectively. Lock springs 70A bias cam plate 40A to be rotated regularly in a clockwise direction, as in FIG. 1.

Figure 8:
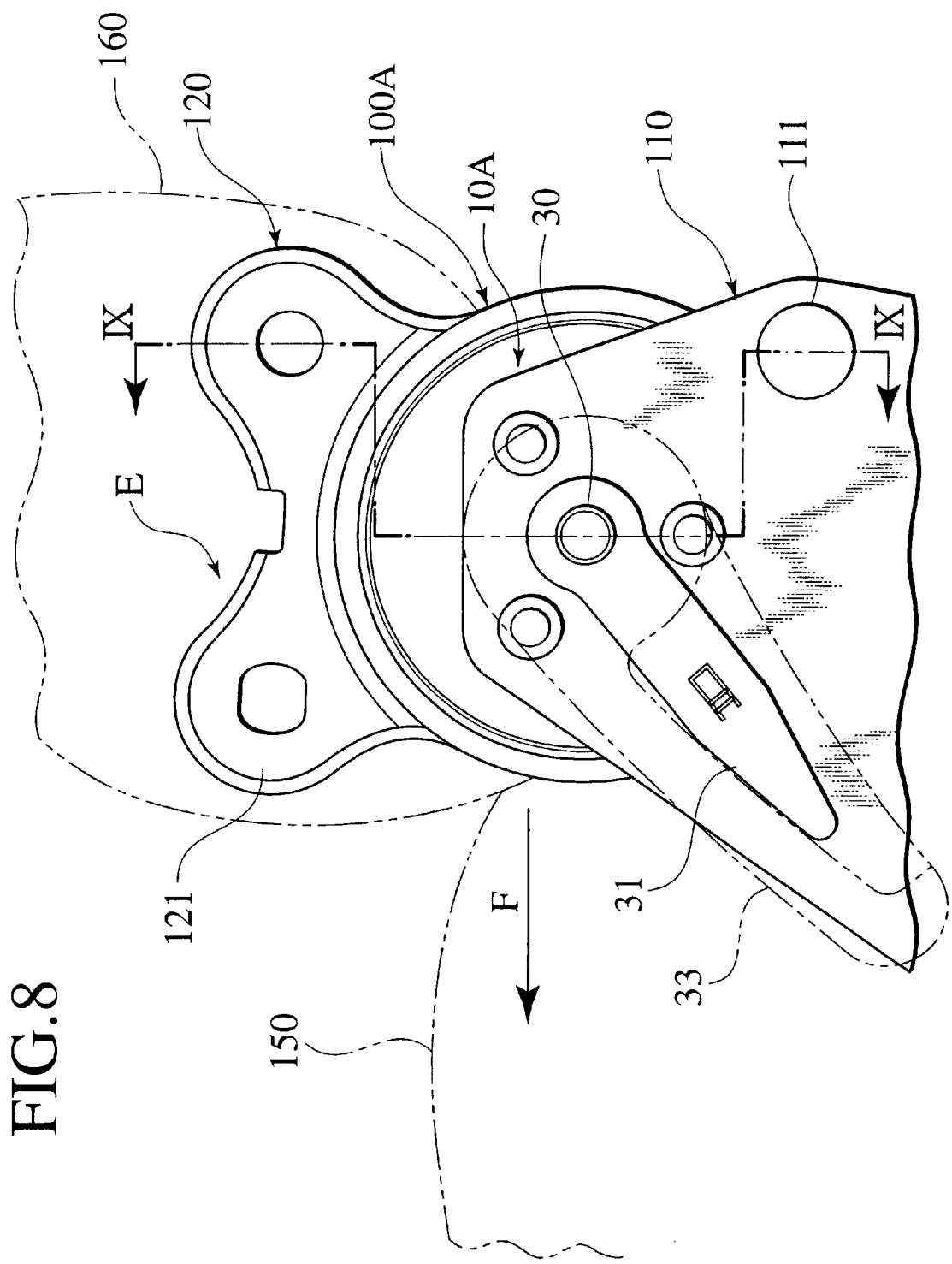
FIG. 8 is an explanatory front view of a seat recliner for a vehicle.
Figure 10:
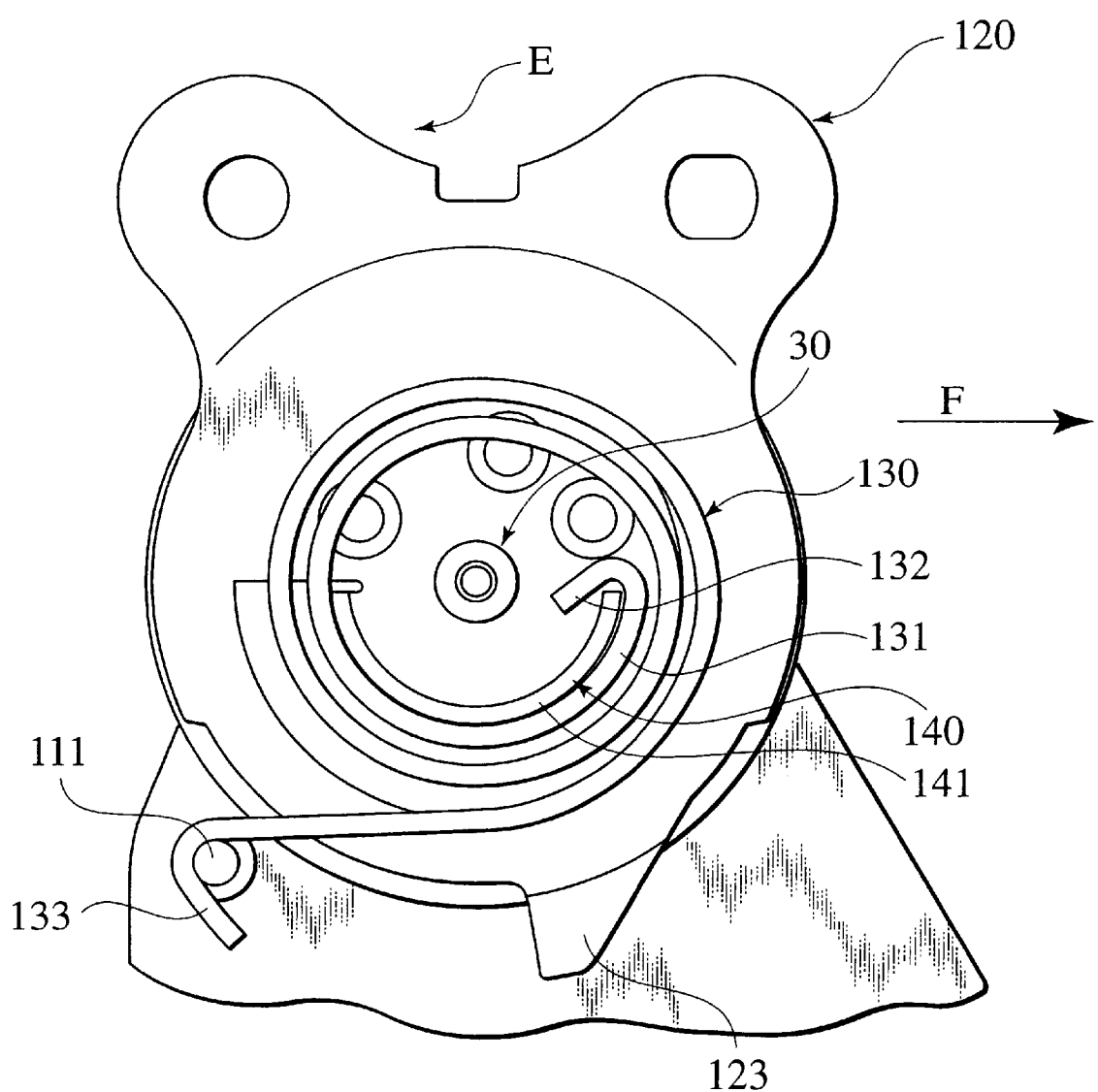
FIG. 10 is an explanatory view directed by arrows of X in FIG. 8.

Arm plate 120 has mounting part 121 to seat back 160; and holding means 140 for holding inner part 131 of helical spring 130 as it shown in FIGS. 8 to 10.

Holding means 140 is provided below through-hole 122 of arm plate 120, and is formed in such a way that arm plate 120 is cut and raised in semicircle along a locus with a predetermined radius of curvature about through-hole 122 as center. Recess 142 is formed to one end of raised part 141 to be latched with inner end 132 of helical spring 130. Outer end 133 of helical spring 130 is latched with lock pin 111 provided to base plate 110. Helical spring 130 biases arm plate 120 to be rotated regularly in the front direction of F in FIG. 10.

In FIG. 10, when arm plate 120 attached to seat back 160 is rotated in the front direction of F, falling-forward-down stopper 123 is brought into contact with lock pin 111 of base plate 110, thus preventing seat back 160 from rotation in the front direction of F. Without being limited to the embodiment, arm plate 120 is to be mounted to frame 10A and lid 60A is to be mounted to seat cushion 150 in contrast with the above structure.

Next, the operation of the aforementioned seat recliner E for a vehicle will be explained.

Figure 3:
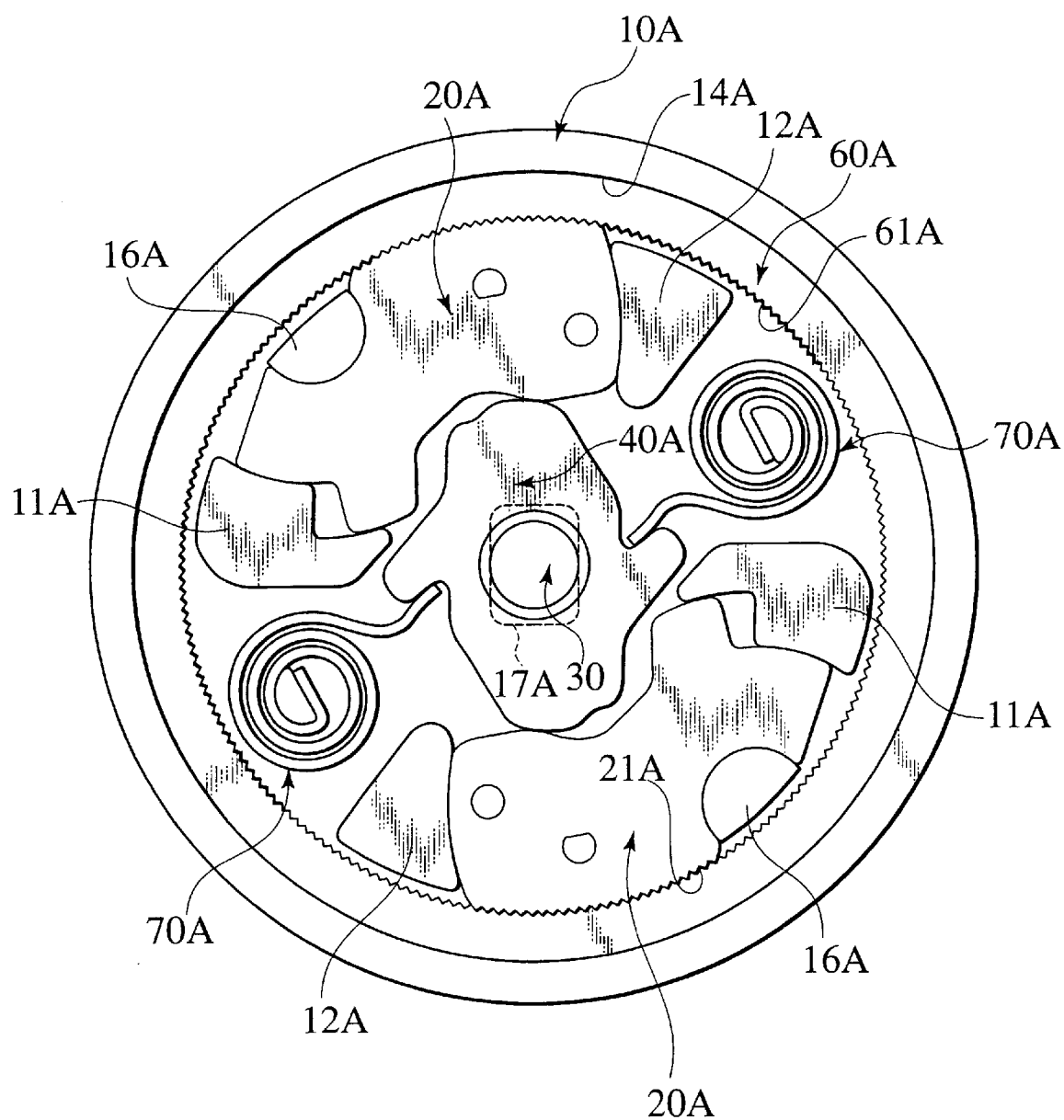
FIG. 3 is an explanatory front view showing a lock mechanism in a locked state.

When lock mechanism 100A is locked, each cam face 41A of cam plate 40A rotates in a clockwise direction due to biasing force of lock spring 70A to press against cam face 25A of locking gear 20A as shown in FIG. 3. The counter-clockwise rotation of locking gear 20A around pivot 16A causes the engagement of external gear 21A with internal gear 61A of lid 60A. This prevents the rotation of lid 60A or seat back 160.

When the aforementioned lock mechanism 100A in a locked state is disengaged, operation shaft 30, as shown in FIG. 1, is rotated in a counterclockwise direction. Cam face 41A of cam plate 40A and cam face 25A of locking gear 20A are disengaged from each other, while disengagement face 44A of cam plate 40A presses against projection 26A of locking gear 20A.

This causes the clockwise rotation of locking gear 20A about pivot 16A, the disengagement of external gear 21A and internal gear 61A of lid 60A from each other, and the rotation of arm plate 120, or seat back 160, mounted to lid 60A in the front direction of F due to biasing force of helical spring 130.

If lock mechanism 100A is restored from the disengaged state into the locked state again when seat back 160 is raised, the detachment from operation shaft 30 holding seat back 160 in a desired inclined state causes the clockwise rotation of cam plate 40A due to biasing force of lock spring 70A. This rotates locking gear 20A in a counterclockwise direction, thus engaging external gear 21A and internal gear 61A with each other in a locked state.

Regarding the above constituted seat recliner E for a vehicle, locking gear 20A is supported by two circular guide faces 11Aa and 11Ab and pivot 16A projecting from frame 10A.

Thus, even if a load is applied to seat back 160 due to collision, locking gear 20A is supported by pivot 16A and one of the arced guide faces. Furthermore, the enlargement of the receiving face enhances a crush load. The meshing of the crushed portions of pivots 16A and one guide with internal gear 61A prevents the rotation of lid 60A. These improves strength considerably.

Second Embodiment

Figure 11:
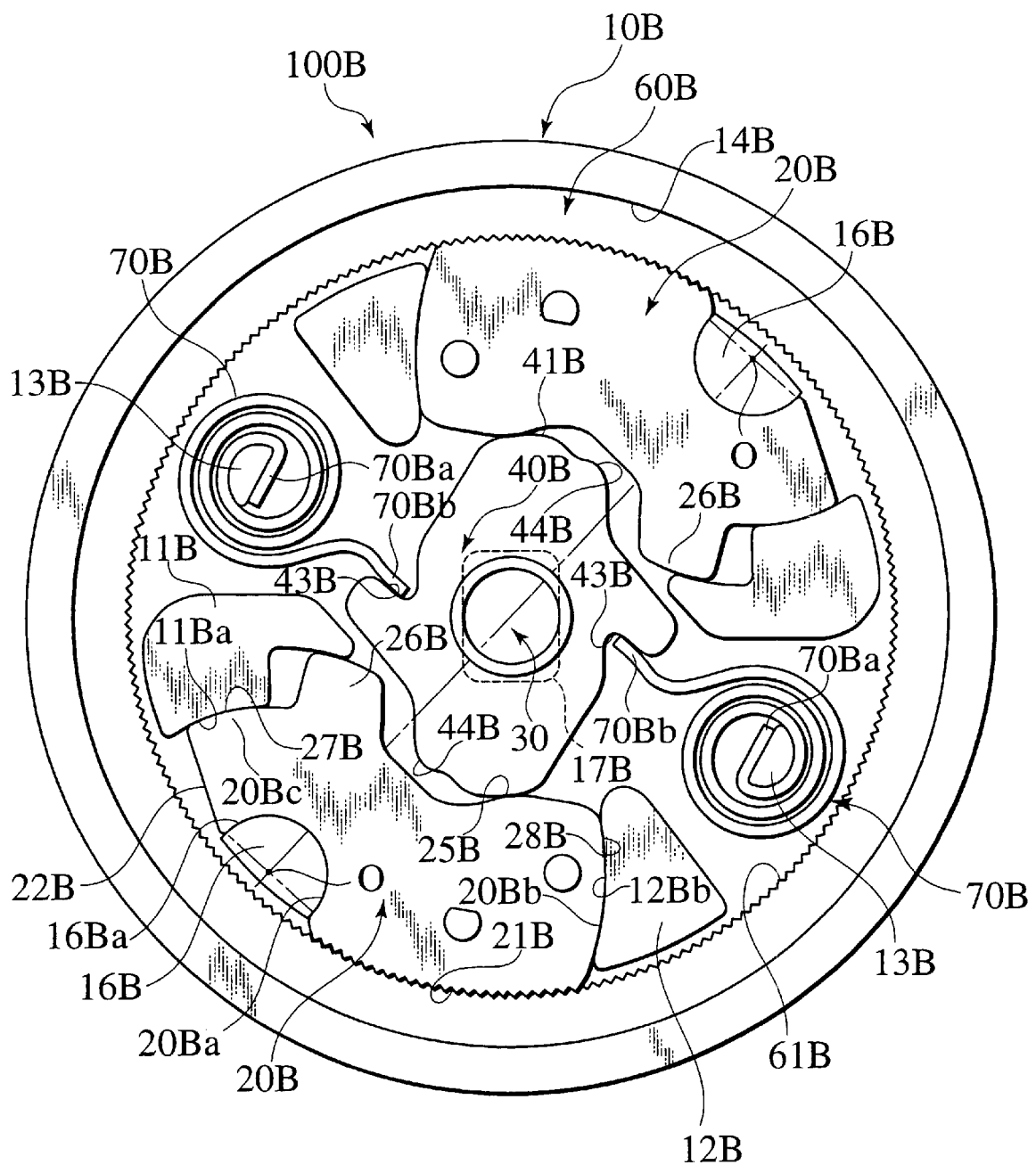
FIG. 11 is an explanatory front view of a lock mechanism according to the second embodiment of the invention.

As shown in FIG. 11, each external gear 21B is formed close to pivot 16B. Tooth 21B and the tooth of internal gear 61B are set at a pressure angle R between 60 to 90 degrees. The whole depth from tip circle in proximity to a rotation center 0 is smaller than that at other portions. The radius of the tip circle in proximity to the rotation center O is larger than that at other portions.

Each pivot 16B with rotation center O of locking gear 20B has the guide face 16Ba of more than 180 degrees, so that the rotation center O is set in proximity to the inner side of internal gear 61B. This increases pivots 16B in a traverse sectional area. This results in the improvement of locking strength and the prevention of looseness, thus providing highly strengthened and compact seat recliner in comparison with conventional ones.

Lock springs 70B are each formed as a helical spring, in the embodiment two springs being located in recess 14B of frame 10B. Bases 70Ba of lock springs 70B adjacent to guide projections 11B are mounted to two projections 13B protruding from the bottom face of recess 14B, respectively. The outer ends 70Bb are locked with engagement portions 43B formed to cam plate 40B. Lock springs 70B bias cam plate 40B to be rotated regularly in a counterclockwise direction, as in FIG. 11.

Next, the operation of the aforementioned seat recliner E for a vehicle will be explained.

When lock mechanism 100B is locked, each cam face 41B of cam plate 41B rotates in a clockwise direction due to biasing force of lock spring 70B to press against cam face 25B of locking gear 20B as shown in FIG. 3. The clockwise rotation of locking gear 20B around pivot 16B causes the engagement of external gear 21B with internal gear 61B of lid 60B. This prevents the rotation of lid 60B or seat back 160.

When the aforementioned lock mechanism 100B in lock state is disengaged, operation shaft 30, as shown in FIG. 1, is rotated in a clockwise direction. Cam face 41B of cam plate 40B and cam face 25B of locking gear 20B are disengaged from each other, while disengagement face 44B of cam plate 40B presses against projection 26B of locking gear 20B.

This causes the counterclockwise rotation of locking gear 20B about pivot 16B, the disengagement of external gear 21B and internal gear 61B of lid 60B from each other, and the rotation of arm plate 120, or seat back 160, mounted to lid 60B in the front direction of F due to biasing force of helical spring 130.

If lock mechanism 100 is restored from the disengagement state into the lock state again when seat back 160 is raised, the detachment from operation shaft 30 holding seat back 160 in a desired inclination state causes the counterclockwise rotation of cam plate 40B due to biasing force of lock spring 70B. This rotates locking gear 20B in a clockwise direction, thus engaging external gear 21B and internal gear 61B with each other in a locked state.

Third Embodiment

Figure 12:
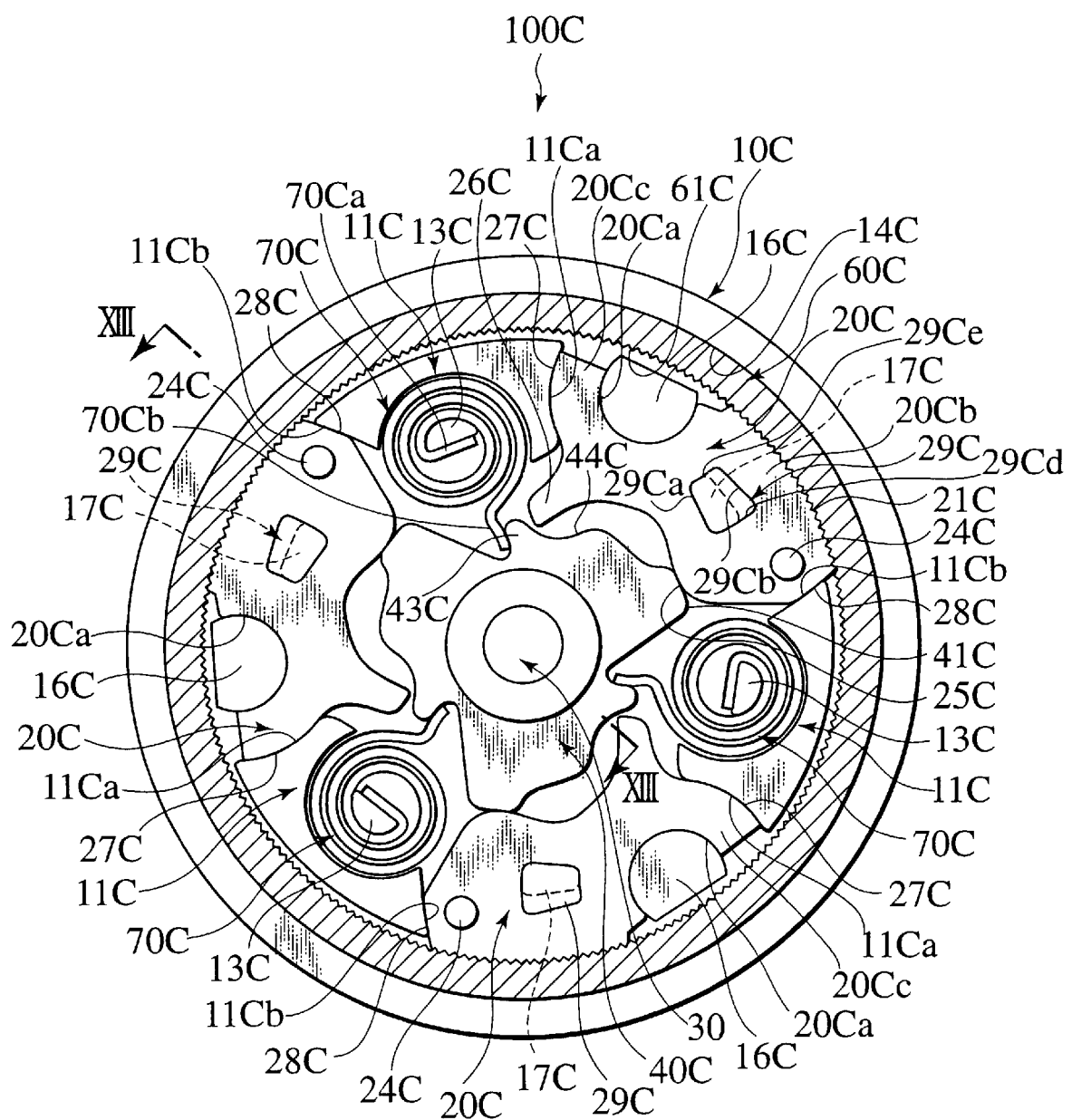
FIG. 12 is an explanatory front view of a lock mechanism according to the third embodiment of the invention.

The embodiment is explained with reference to 12 to 21. In the seat recliner E for a vehicle as shown in FIG. 12, lid 60C is fitted in the inner side of circular recess 14C formed to circular frame 10C, to be rotated along the inner circumferential face of frame 10C. The engagement of locking gears 20C, located in a regular arrangement in frame 10C, and internal gear 61C formed to the inner circumferential face of lid 60C, prevent the relative rotation of frame 10C and lid 60C. The rotation of operation shaft 30 through frame 10C and lid 60C causes the disengagement of locking gears 20C via cam plate 40C integral with operation shaft 30, the disengagement of locking gears 20C and internal gear 61C from each other, and the free relative rotation of frame 10C and lid 60C. These constitute lock mechanism 100C.

Frame 10C has base plate 110 mounted on its outer side, which is attached to seat cushion 150. Lid 60C has arm plate 120 mounted on its outer side, which is attached to seat back 160.

Each semicircular pivot 16C, protruding integrally from frame 10C, and a pair of arced guide faces 11Ca and 11Cb allow locking gear 20C to be rotated about pivot 16C. Each side of free ends of the locking gears 20C has external gear 21C formed thereon, which is to be engaged with internal gear 61C. The opposite side to external gear 21C has cam face 25C formed thereon, allowing locking gear 20C to be pivoted on pivot 16C. The free end has guide opening 29C formed in its central portion, which engages with guide protrusion 17C protruding from frame 10C.

Guide openings 29C are each formed in an arced shape about pivot 16C as center, with both ends 29Ca and 29Cb formed in plane shape. Guide protrusions 17C each have arced parts 17Cd and 17Ce in slidable contact with arced parts 29Cd and 29Ce of guide opening 29C; and plane parts 17Ca and 17Cb to be brought in contact with plane parts 29Ca and 29Cb of guide opening 29C.

The traverse embossing process of the central portion at the free end of locking gear 21C forms a recess as guide opening 29C.

The following explains the above constitution in further detail.

Locking gears 20C are slidably held between the bottom face of recess 14C of frame 10C and the inner face of lid 60C, with at least one, for example, three radially arranged at an equal interval, thus being rotatable by arced guide face 11Ca about semicircle pivot 16C protruding from the bottom face of recess 14C of frame 10C. The outer circumferential faces of pivots 16C facing to internal gear 61C are cut flat so as not to engage with internal gear 61C.

The end face at free end 20Cb of locking gear 20C has arced contact face 28C about the center of pivot 16C formed thereon. This contact face 28C is set to be slidably contacted with arced guide face 11Cb of guide projection 11C formed to frame 10C. Thus, pivot 16C and two arced guide faces 11Ca and 11Cb allow locking gear 20C to be rotated about pivot 16C.

Free ends 20Cb of locking gears 20C are each embossed at the central portion thereof to form fan-shaped guide opening 29C with an arced face about the center of pivot 16C. Guide opening 29C is slidably contacted with fan-shaped guide protrusion 17C protruding from frame 10C, with a gap in a circumferential direction. When external gear 21C of locking gear 20C and internal gear 61C are engaged with each other, guide protrusion 17C moves toward inner side 29Ca of guide opening 29C. When external gear 21C of locking gear 20C and internal gear 61C are disengaged from each other, guide protrusion 17C moves toward outer side 29Cb of guide opening 29C.

Fee ends 20Cb of locking gears 20C each has protrusion 24C protruding between arced contact face 28C and guide opening 29C toward the inner side of lid 60C. Protrusion 24C is slidably contacted with stepped part 64C formed on the inner side of lid 60C and in proximity to internal gear 61C (See FIGS. 13 and 16).

Stepped parts 64C has three arced part 64Ca with a large diameter and about the center of lid 60C, being arranged at an interval of 120 degrees; and three concentric arced part 64Cb with a small diameter, each of which is joined to arced part 64Ca via oblique face.

Figure 13:
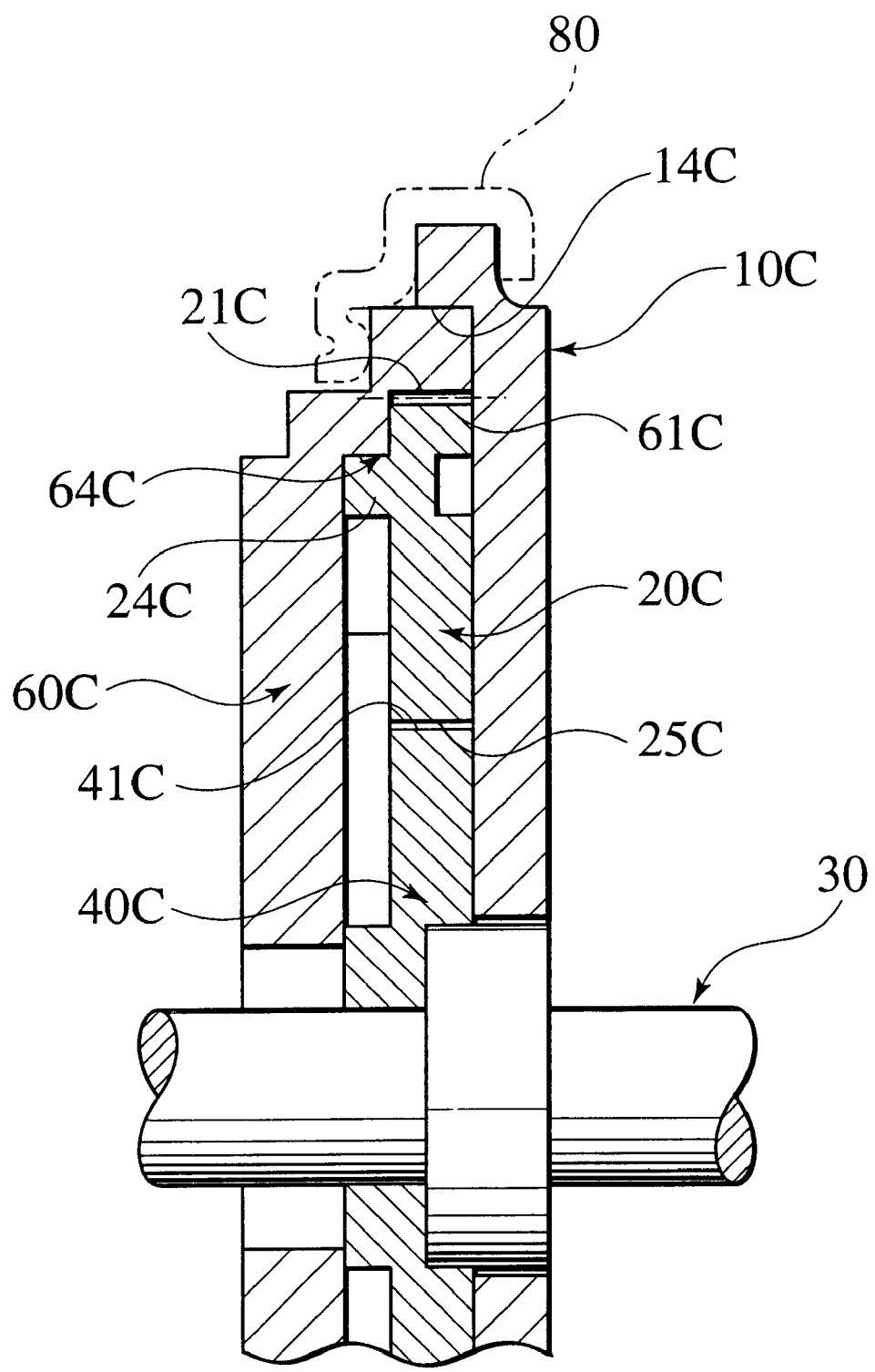
FIG. 13 is an explanatory sectional view taken in line of XIII—XIII of FIG. 12.
Figure 14:
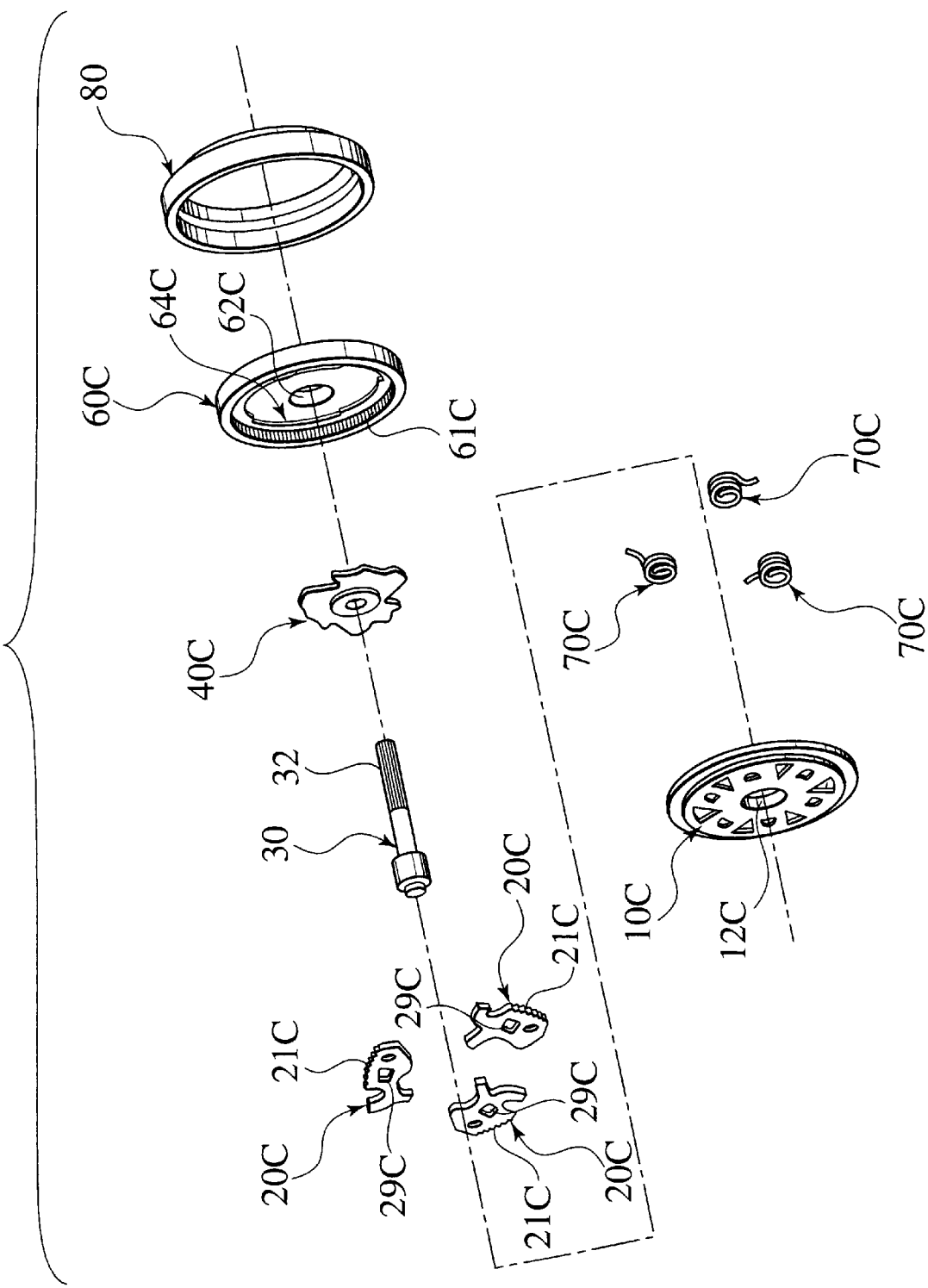
FIG. 14 is an explanatory exploded perspective view of a lock mechanism.
Figure 15:
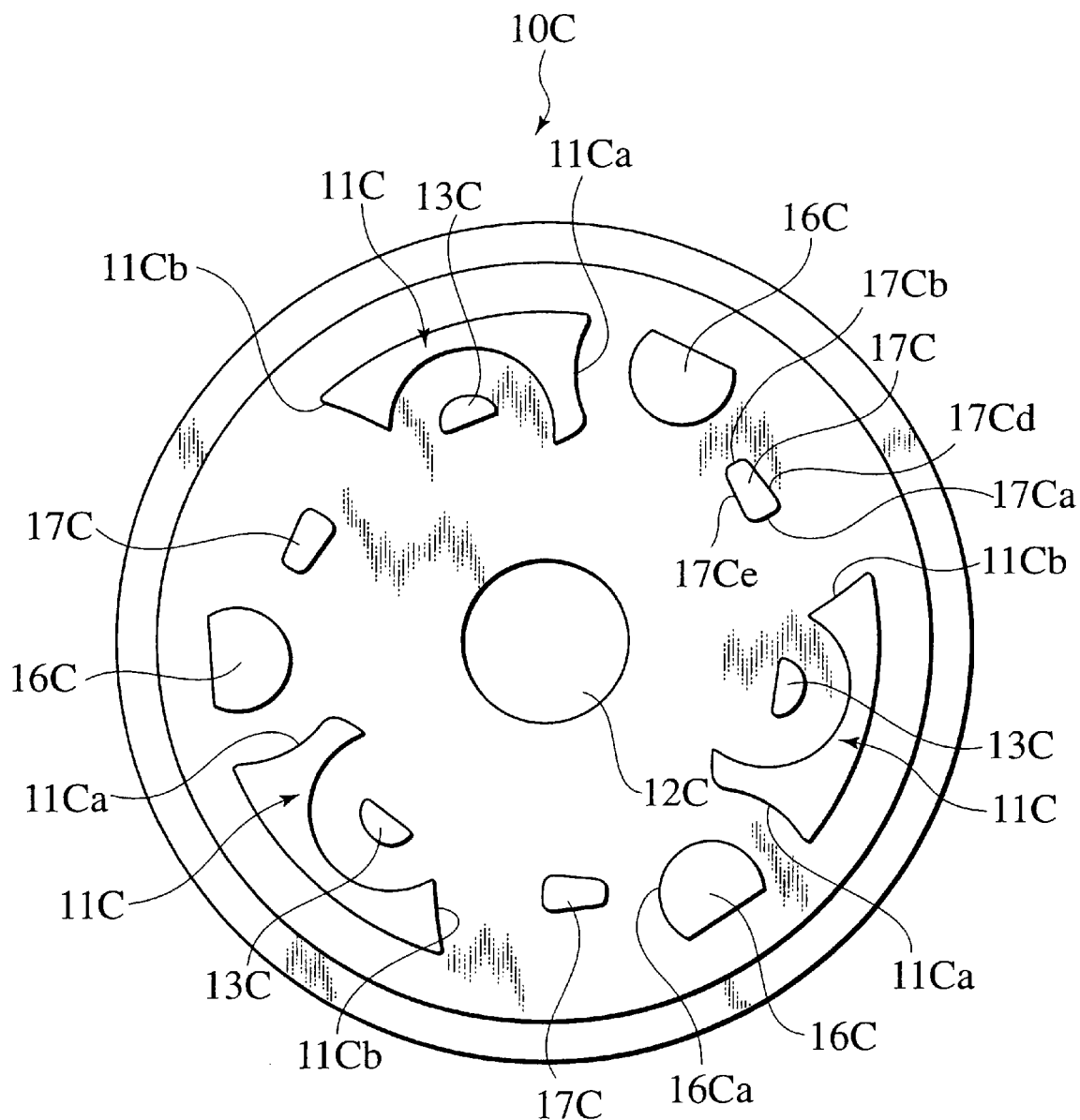
FIG. 15 is an explanatory front view of a frame.
Figure 16:
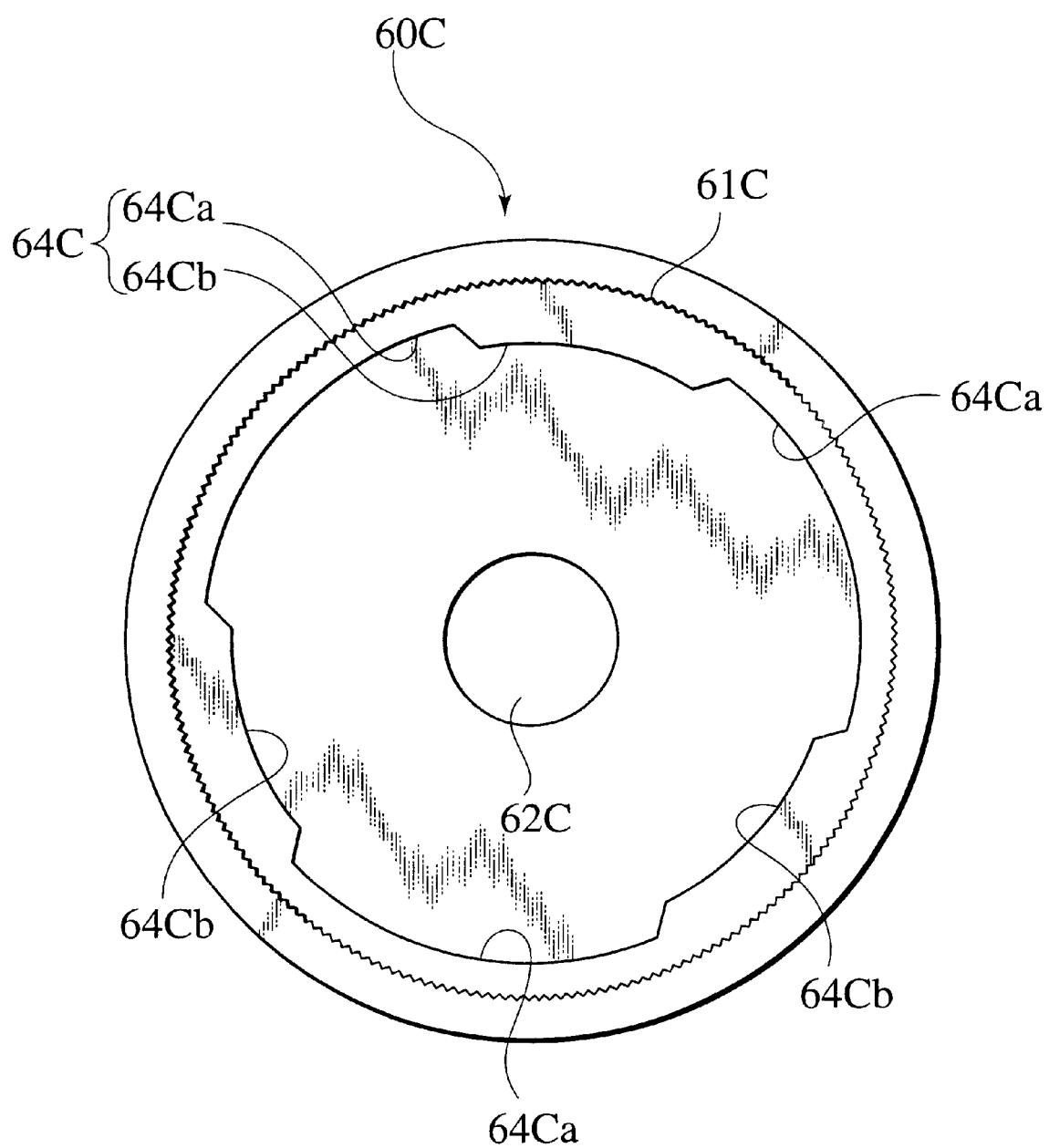
FIG. 16 is an explanatory rear view of a lid.
Figure 17:
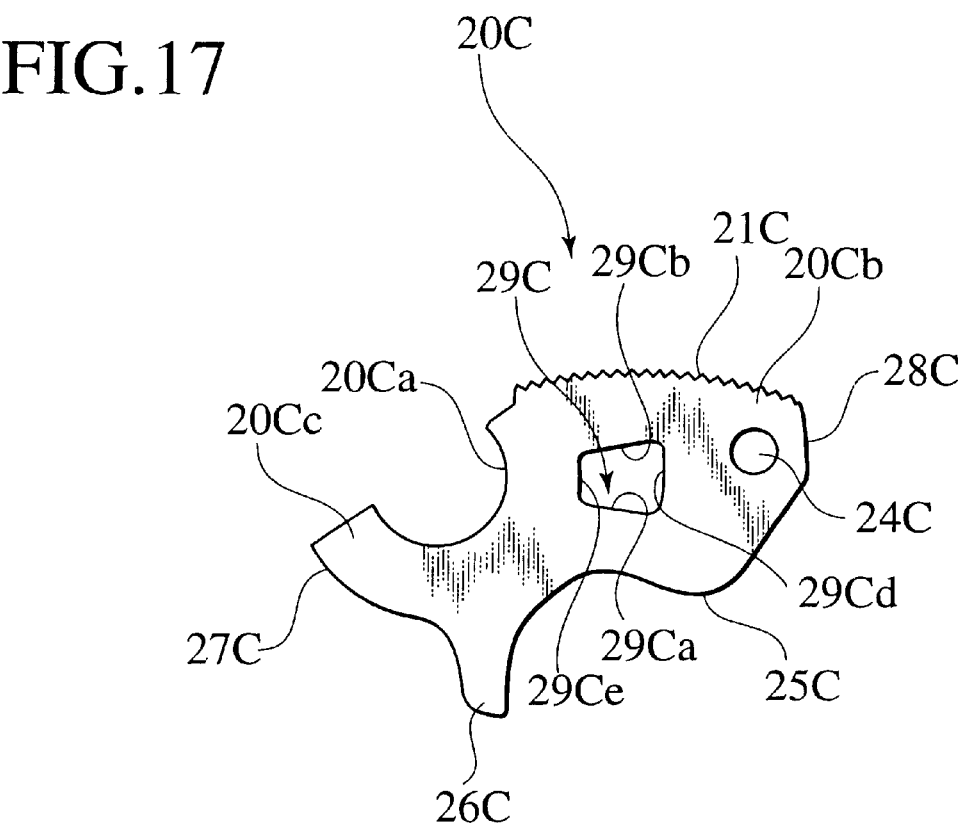
FIG. 17 is an explanatory front view of a locking gear.
Figure 18:
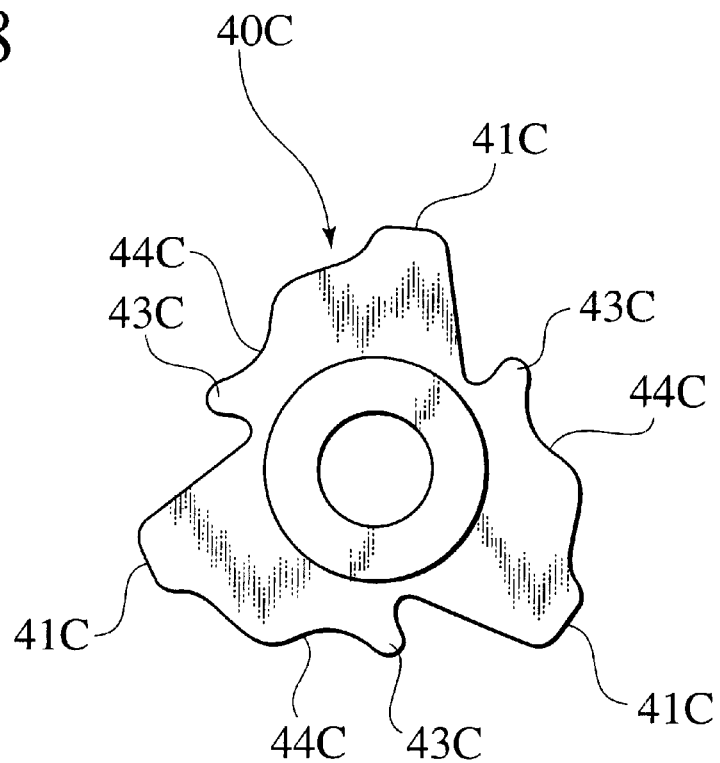
FIG. 18 is an explanatory front view of a cam plate.
Figure 19:
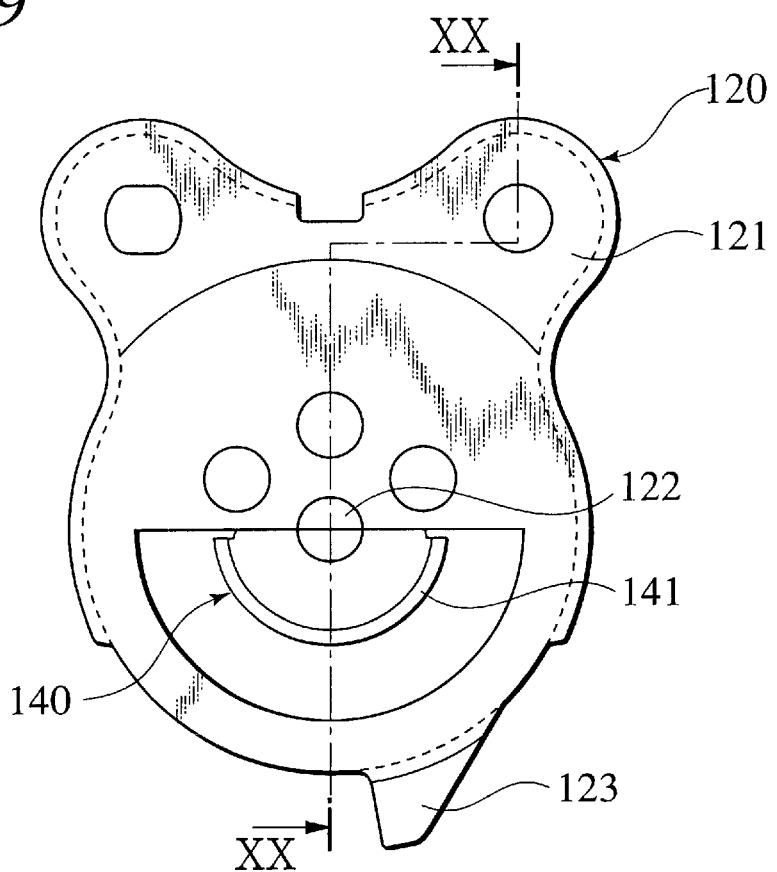
FIG. 19 is an explanatory front view of an arm plate.
Figure 20:
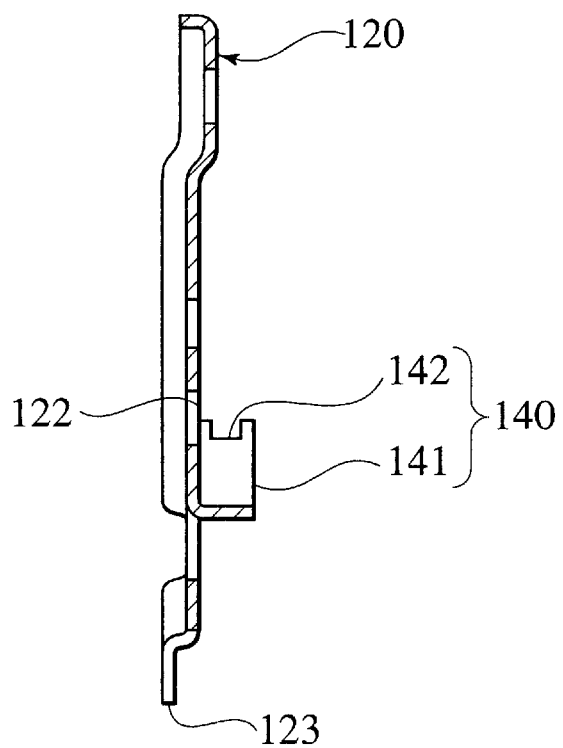
FIG. 20 is an explanatory sectional view taken in line indicated by arrows of XX in FIG. 19.

When external gear 21C locking gear 20C and internal gear 61C are engaged with each other, projection 24C is brought in contact with large diameter arced part 64Ca (See FIGS. 13 and 16). If external gear 21C of locking gear 20C and internal gear 61C are disengaged from each other when seat back 160 falls down, projection 24C is brought in contact with small diameter arced part 64Cb.

Next, the operation of the aforementioned seat recliner E for a vehicle will be explained.

When lock mechanism 100C is locked, each cam face 41C of cam plate 40C rotates in a clockwise direction due to biasing force of lock spring 70C to press against cam face 25C of locking gear 20C as shown in FIG. 12. The counterclockwise rotation of locking gear 20C around pivot 16C causes the engagement of external gear 21 with internal gear 61C of lid 60C. This prevents the rotation of lid 60C or seat back 160.

At this time, inner side 29Ca of guide opening 29C of locking gear 20C is brought in contact with guide protrusion 17C of frame 10C, while projection 24C is brought in contact with arced part 64Ca of stepped part 64C of lid 60C.

Figure 21:
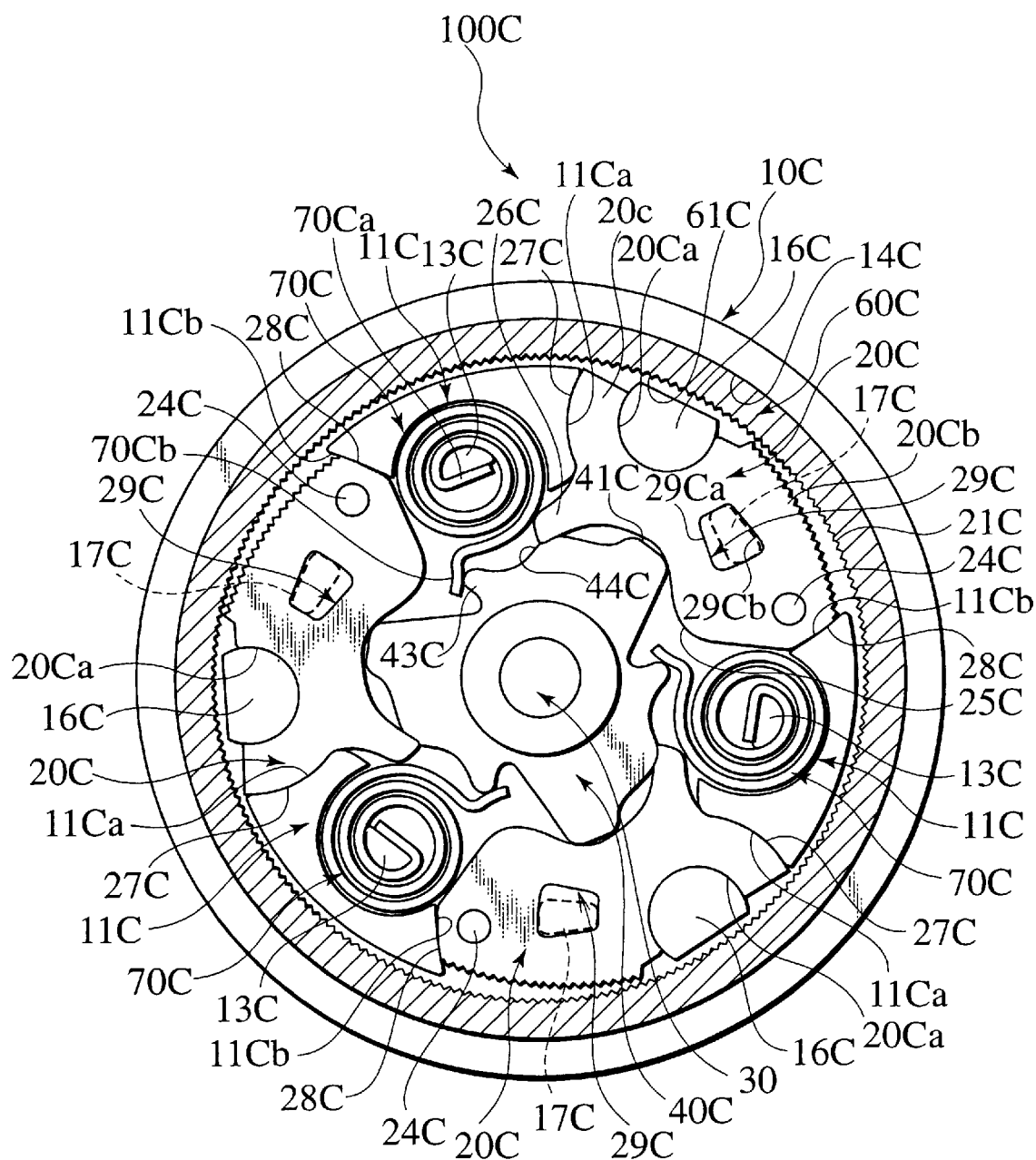
FIG. 21 is an explanatory sectional view of a lock mechanism in a disengaged state.

When the aforementioned lock mechanism 100C in a locked state is disengaged, operation shaft 30, as shown in FIG. 21, is rotated in a counterclockwise direction. Cam face 41C of cam plate 40C and cam face 25C of locking gear 20C are disengaged from each other, while disengagement face 44C of cam plate 40C presses against projection 26C of locking gear 20C.

This causes the clockwise rotation of locking gear 20C about pivot 16C, the disengagement of external gear 21C and internal gear 61C of lid 60C from each other, and the rotation of arm plate 120, or seat back 160, mounted to lid 60C in the front direction of F due to biasing force of helical spring 130.

At this time, outer side 29Cb comes in contact with guide protrusion 17C of frame 10C. When seat back 160 is raised, protrusion 24C of locking gear 20C is positioned to face arced part 64Ca of stepped part 64C of lid 60C. When seat back 160 is fallen down, protrusion 24C comes in contact with arced part 64Cb of stepped part 64C, thus holding a disengaged state.

If lock mechanism 100C is restored from the disengaged state into a locked state again when seat back 160 is raised, the detachment from operation shaft 30 holding seat back 160 in a desired inclined state causes the clockwise rotation of cam plate 40C due to biasing force of lock spring 70C as shown in FIG. 21. This rotates locking gear 20C in a counterclockwise direction, thus engaging external gear 21C and internal gear 61C with each other in a locked state.

Seat back 160 in a fallen-down state is raised. Protrusion 24C of locking gear 20C is detached from arced part 64Cb of stepped part 64C. Similarly to the raised state, the clockwise rotation of cam plate 40C causes the counterclockwise rotation of locking gear 20C in a locked state.

Regarding the above constituted seat recliner E for a vehicle, locking gear 20C is supported by pivot 16C protruding from frame 10C, two circular guide faces 11Ca and 11Cb, and guide protrusion 17C. Thus, even if a load is applied to seat back 160 due to collision, locking gear 20C is supported by pivot 16C, one of the arced guide faces, and the guide protrusion. Furthermore, the enlargement of the receiving face enhances a crush load. The meshing of the crushed portions of pivots 16C and one guide with internal gear 61C prevents the rotation of lid 60C. These improves strength considerably.

The traverse embossing of locking gear 20C forms a recess as guide opening 29C, and the formation of guide opening 29C prevents the lowering of the strength of the locking gear, thus preventing the lowering of locking strength.

Fourth Embodiment

Figure 22:
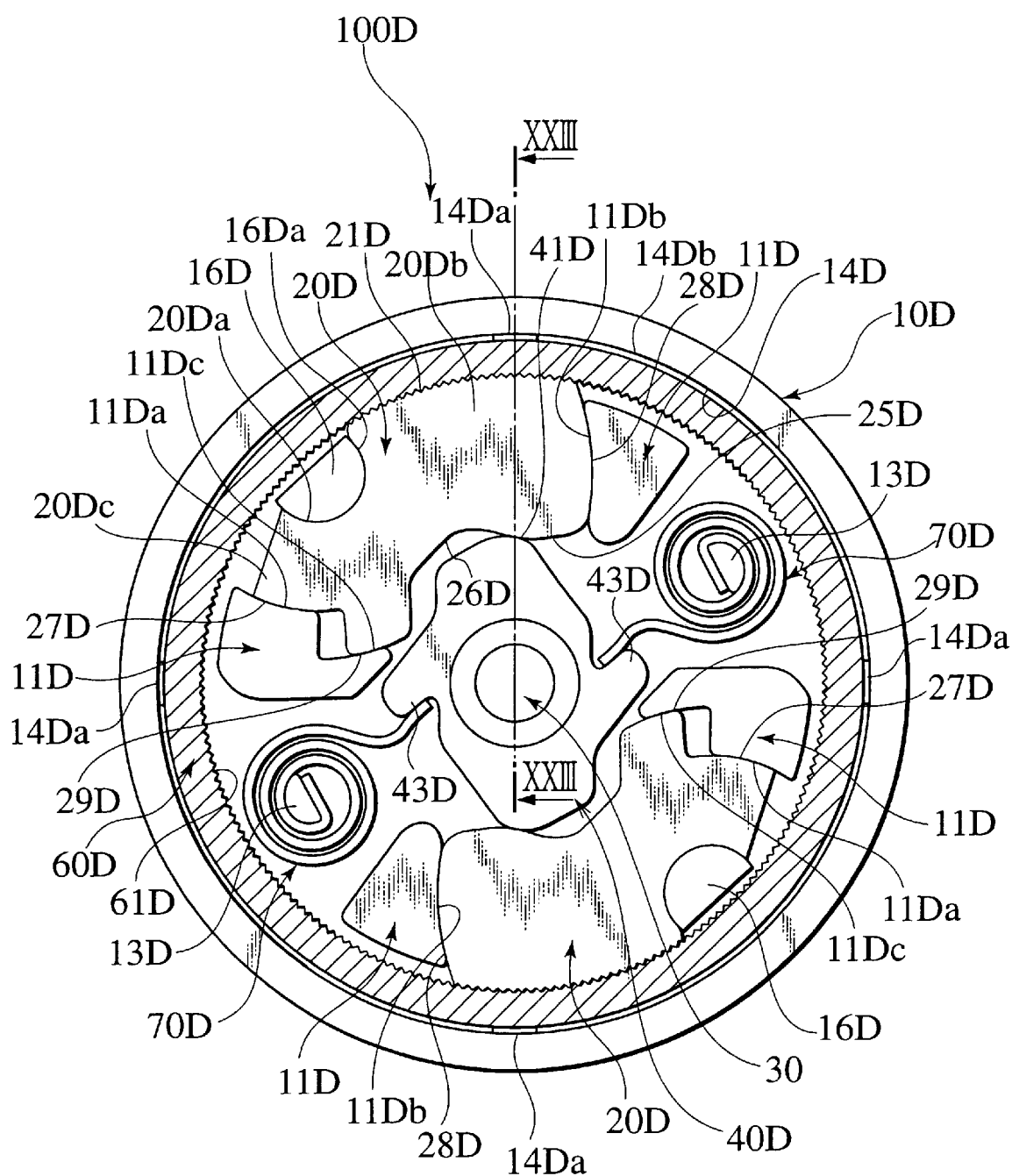
FIG. 22 is an explanatory front view showing a lock mechanism according to the fourth embodiment of the invention.
Figure 23:
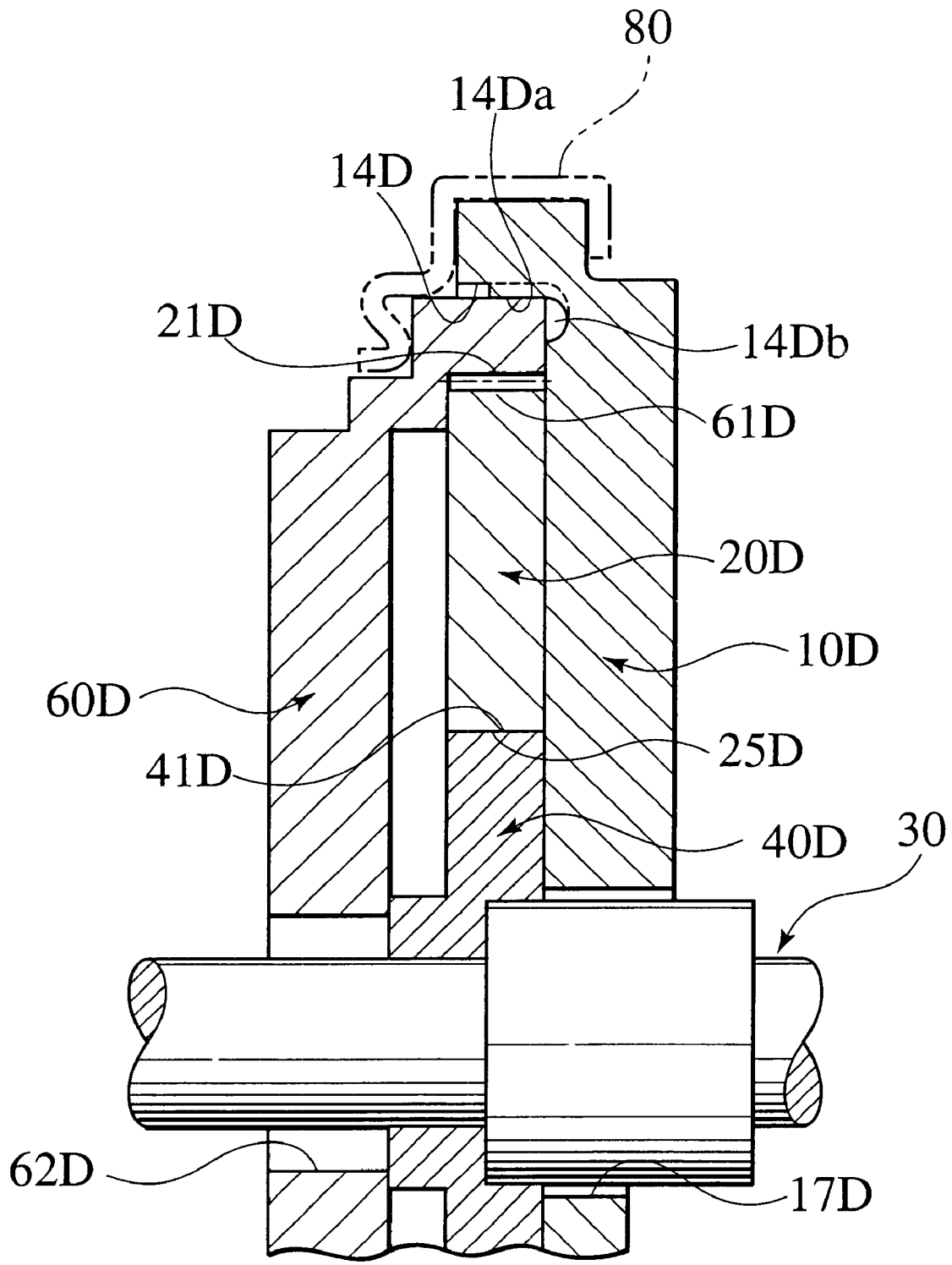
FIG. 23 is an explanatory sectional view taken in line indicated by arrows of XXIII.
Figure 24:
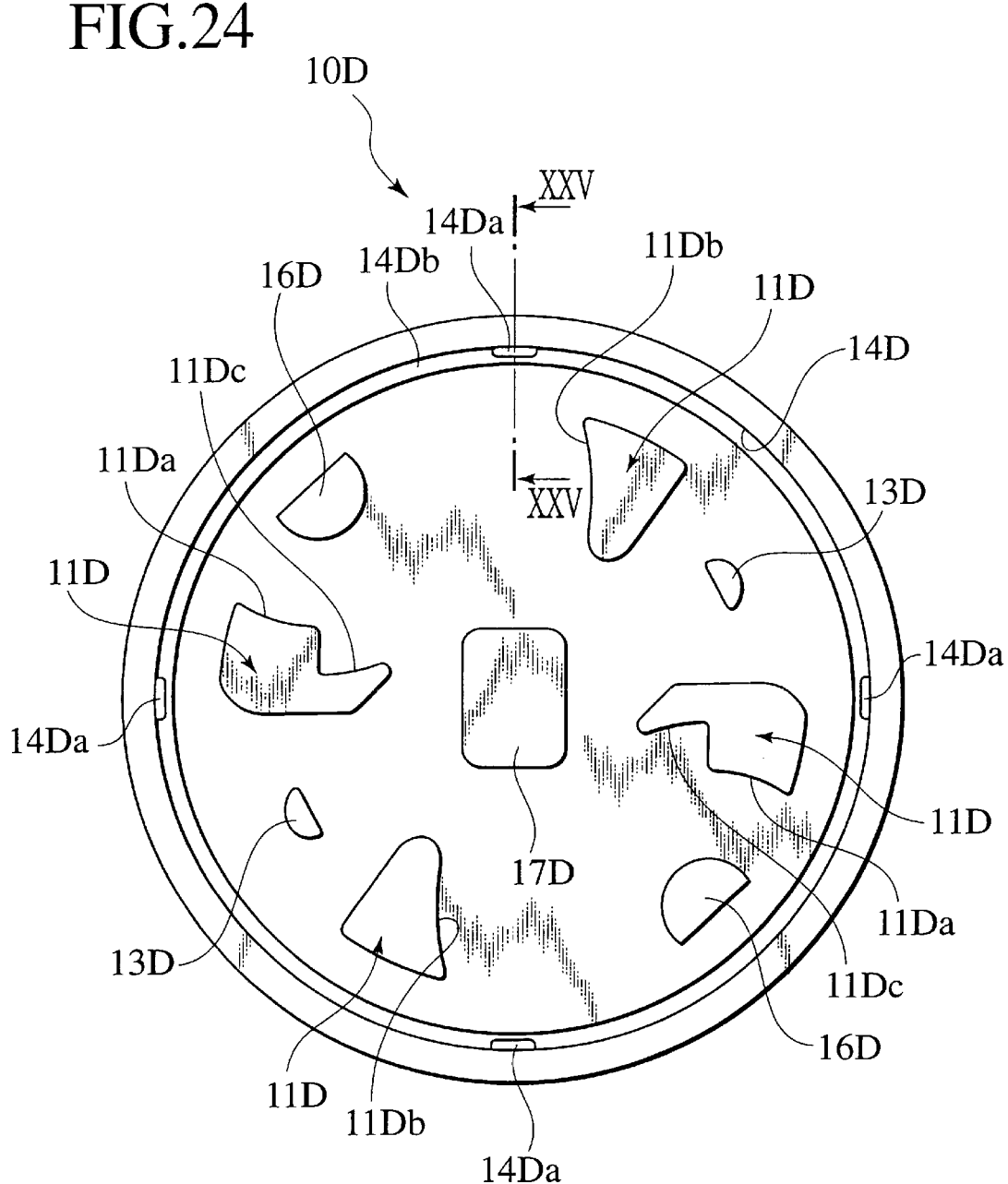
FIG. 24 is an explanatory front view of a frame.
Figure 25:
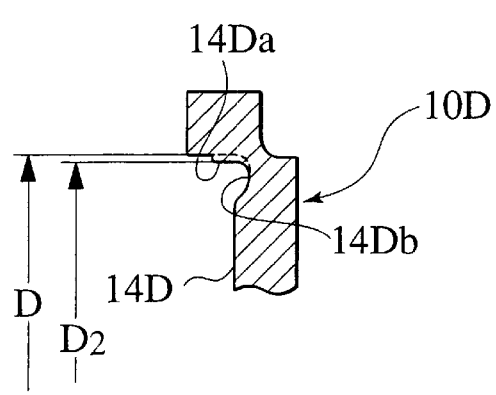
FIG. 25 is an explanatory sectional view taken in line indicated by arrows of XXV.
Figure 26:
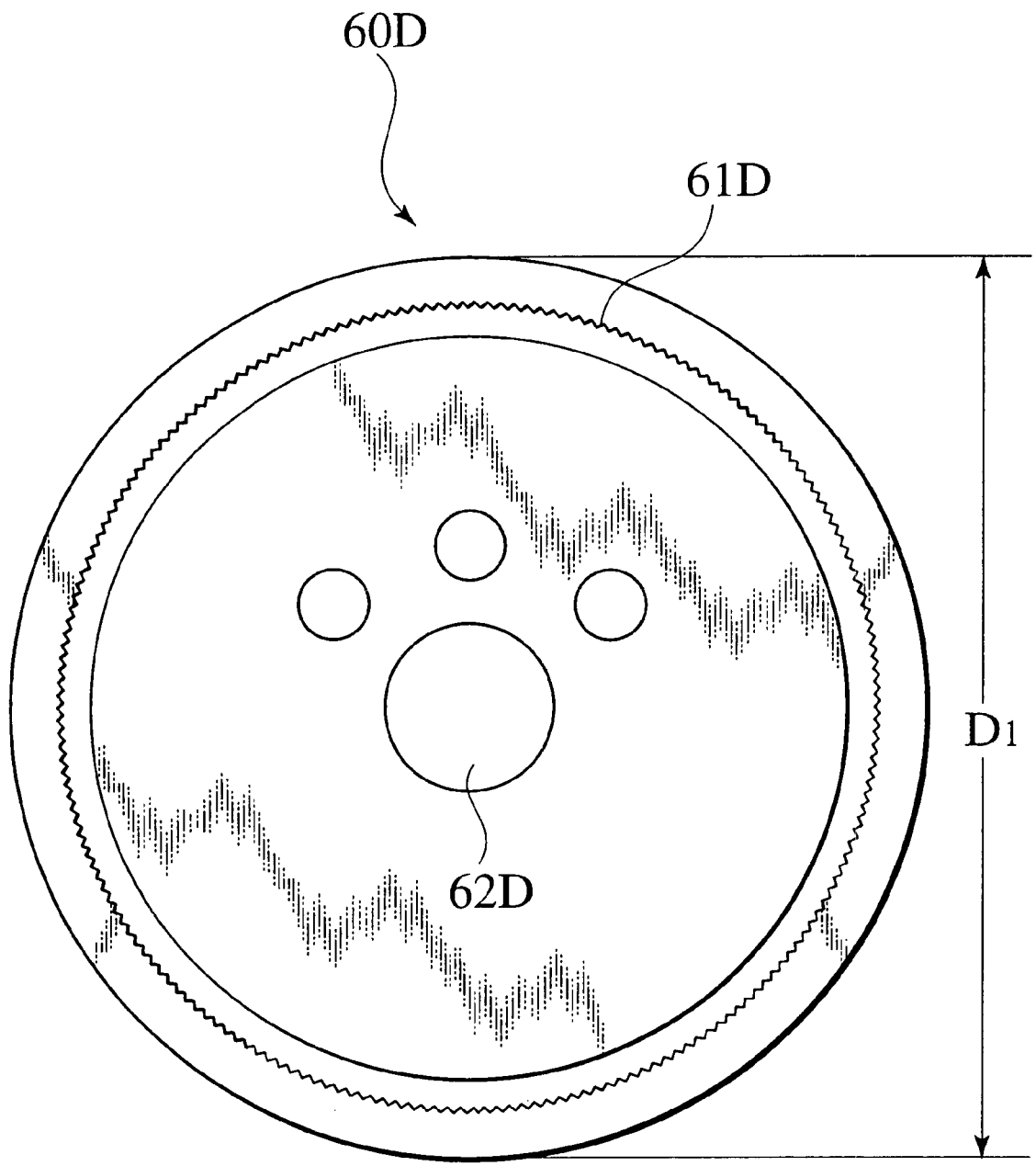
FIG. 26 is an explanatory rear view of a lid.
Figure 27:
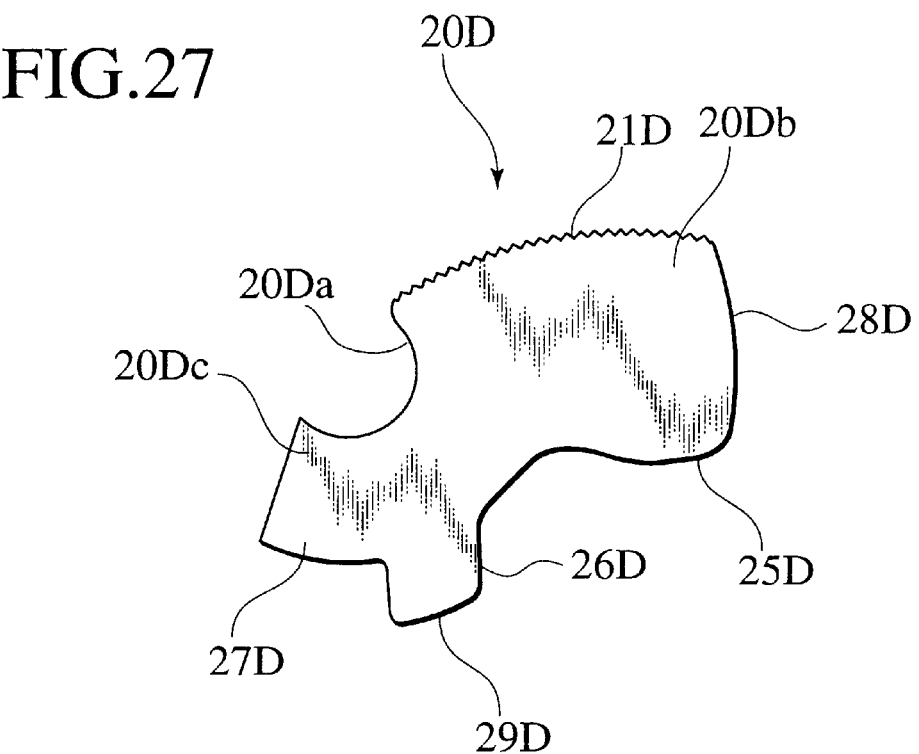
FIG. 27 is an explanatory front view of a locking gear.
Figure 28:
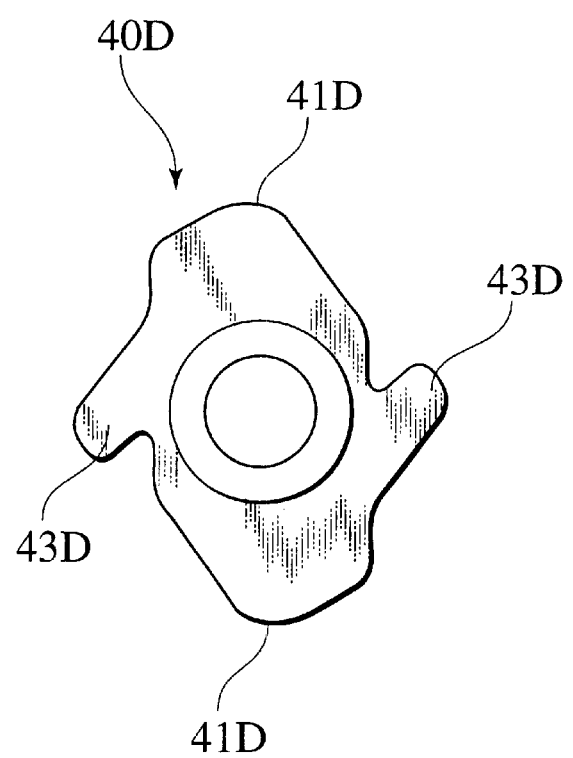
FIG. 28 is an explanatory cam plate of a cam plate.
Figure 29:
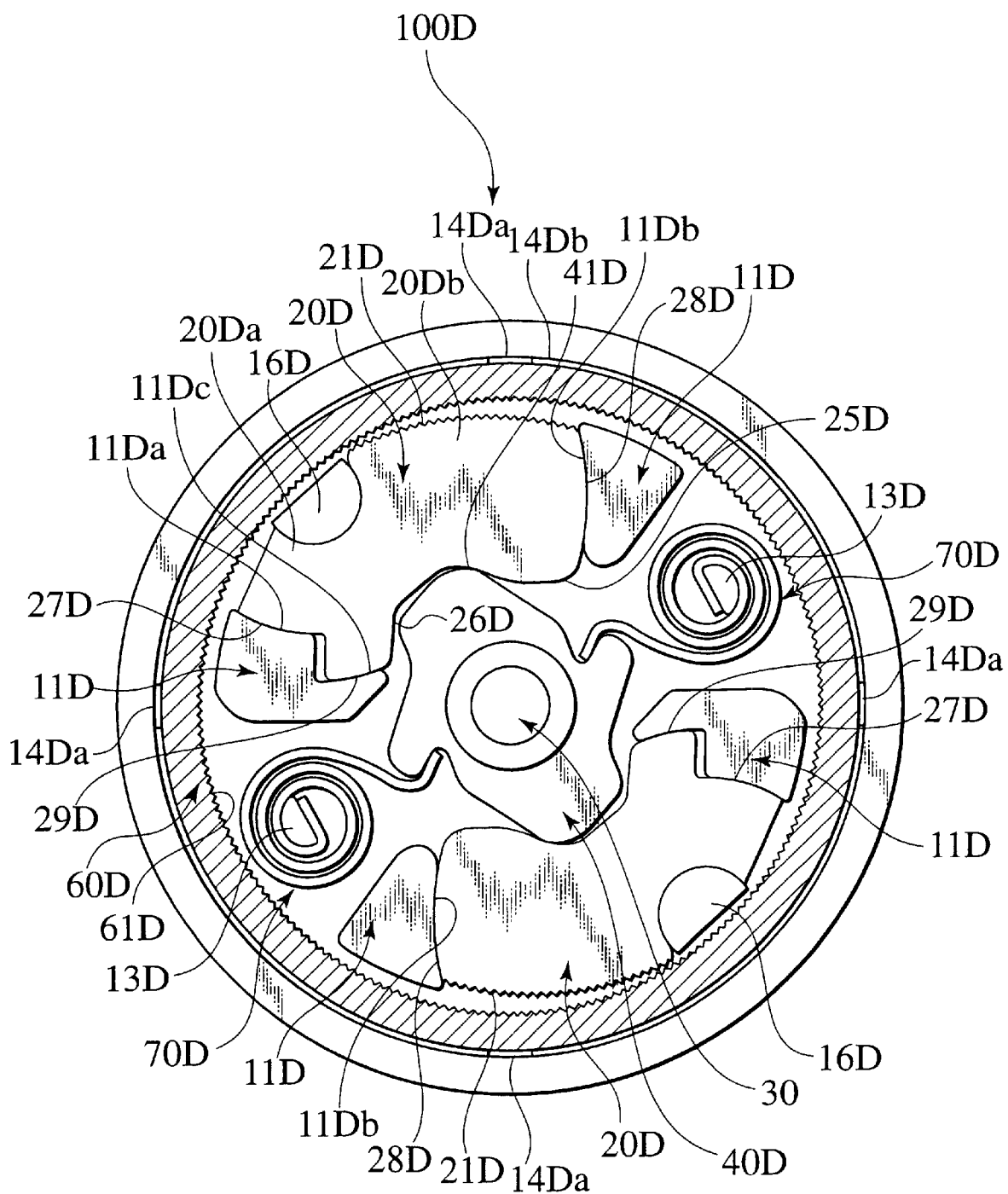
FIG. 29 is an explanatory front view of a lock mechanism in a disengaged state.

The embodiment is explained with reference to FIGS. 22 to 29. In the seat recliner E for a vehicle as shown in FIG. 22, lid 60D is fitted in the inner side of circular recess 14D formed to frame 10D, to be rotated along the inner circumferential face of frame 10D. The engagement of locking gears 20D, located in a regular arrangement in frame 10D, and internal gear 61D formed to the inner circumferential face of lid 60D, prevent the relative rotation of frame 10D and lid 60D. The rotation of operation shaft 30 through frame 10D and lid 60D causes the disengagement of locking gears 20D via cam plate 40D integral with operation shaft 30, the disengagement of locking gears 20D and internal gear 61D from each other, and the free relative rotation of frame 10D and lid 60D. These constitute lock mechanism 100D.

The inner circumferential face of circular recess 14D has projections 14Da located thereon at an interval.

The following explains the above constitution in further detail.

Frame 10D is formed as a disc, with concentric circular recess 14D formed within it and close to its outer circumferential face. Circular recess 14D has four projections 14Da projecting radially inward from its inner circumferential face, at an interval of, for example, 90 degrees, with projections 14Da each having an internal diameter of D2 smaller than an external diameter of D1 of lid 60D. Recess 14D has recess 14Db formed over all the circumference at its corner.

Frame 10D has a mechanical strength smaller than lid 60D.

Lid 60D is formed as a disc with its outer circumferential face fitted with a little clearance into circular recess 14D of frame 10D, thus being inserted into recess 14D for rotation. Lid 60D has concentric internal gear 61D formed on its inner circumferential face.

Locking gears 20D are slidably held between the bottom face of recess 14D of frame 10D and the inner face of lid 60D, with at least one, for example, two arranged at an interval of 180 degrees, thus being rotatably mounted to semicircular pivot 16D protruding from the bottom face of recess 14D of frame 10D. The outer circumferential faces of pivots 16D facing to internal gear 61D are cut flat so as not to engage with internal gear 61.

The end face at base 20Da of locking gear 20D has arced contact faces 27D and 29D about rotation center O of pivot 16D formed thereon. The contact faces 27D and 29D are set to be slidably contacted with arced guides 11Da and 11Dc of guide projection 11D formed to frame 10D.

At each one side (at internal gear 61D) of free ends 20Db of locking gears 20D, arced gear, i.e. external gear 21D with a radius identical to internal gear 61D is formed thereon to engage with internal gear 61D. The opposite side of free end 20Db has cam face 25D to be engaged with cam face 41D of cam plate 40D to be described later; and disengagement face 26D adjacent to cam face 25D, each formed thereon.

The end face at free end 20Db of locking gear 20D has arced contact face 28D about rotation center O of pivot 16D formed thereon. This contact face 28D is to be slidably contacted with arced guide face 11Db of guide projection 11D. Thus, pivot 16D and three arced guide faces 11Da, 11Db and 11Dc allow locking gear 20D to be rotated about the center of pivot 16.

Cam plate 40D is pressed to the intermediate portion of operation rod 30 to be fixed, with cam faces 41D and disengagement faces 44D formed on its outer circumference, to be engaged with cam faces 25D.

Lock springs 70D are each formed as a helical spring, in the embodiment two springs being located in recess 14D of frame 10D. The bases of lock springs 70D are mounted to two projections 13D respectively, each of which projects from the bottom face of circular recess 14D of frame 10D. The outer ends are locked with engagement portions 43D formed to cam plate 40D, respectively. Lock springs 70D bias cam plate 40D to be rotated regularly in a clockwise direction, as in FIG. 22.

Next, the operation of the aforementioned seat recliner E for a vehicle will be explained.

When lock mechanism 100D is locked, each cam face 41D of cam plate 40D rotates in a clockwise direction due to biasing force of lock spring 70D to press against cam face 25D of locking gear 20D as shown in FIG. 22. The counterclockwise rotation of locking gear 20D around pivot 16D causes the engagement of external gear 21D with internal gear 61D of lid 60D. This prevents the rotation of lid 60D or seat back 160.

When the aforementioned lock mechanism 100D in a locked state is disengaged, operation shaft 30, as shown in FIG. 22, is rotated in a counterclockwise direction. Cam face 41D of cam plate 40D and cam face 25D of locking gear 20D are disengaged from each other, and cam face 41D of cam plate 40D is engaged with disengagement face 26D of locking gear 20D.

This causes the clockwise rotation of locking gear 20D about pivot 16D, the disengagement of external gear 21D and internal gear 61D of lid 60D from each other in a disengaged state, and the rotation of arm plate 120, or seat back 160, mounted to lid 60D in the front direction of F due to biasing force of helical spring 130.

If lock mechanism 100D is restored from a disengaged state into a locked state again when seat back 160 is raised, the detachment from operation shaft 30 holding seat back 160 in a desired inclined state causes the clockwise rotation of cam plate 40D due to biasing force of lock spring 70D. This rotates locking gear 20D in a counterclockwise direction in FIG. 29, thus engaging external gear 21D and internal gear 61D with each other in a locked state.

The embodiment has locking gear 20D to be rotated about the center of pivot 16D, while being adapted to a lock mechanism allowing locking gear 20D to be radially slid.

According to the above constituted seat recliner E for a vehicle, when the inner side of circular recess 14D of frame 10D is assembled with the outer circumferential face of lid 60D, shaving projections 14Da with the outer circumferential face, lid 60D is forced to be inserted. Even if product variation between frame 10D and lid 60D occurs, the looseness between recess 14D and the outer circumferential face of lid 60D effectively is minimized, thus smoothing the rotation of lid 60D relative to frame 10D. This prevents the occurrence of the looseness of seat back 160 in the locked state of lock mechanism 100D.

Each shaved portion of projection 14Da comes into recess 10Db of frame 10D, thus preventing the axial slight movement of lid 60D.

Fifth Embodiment

Figure 30:
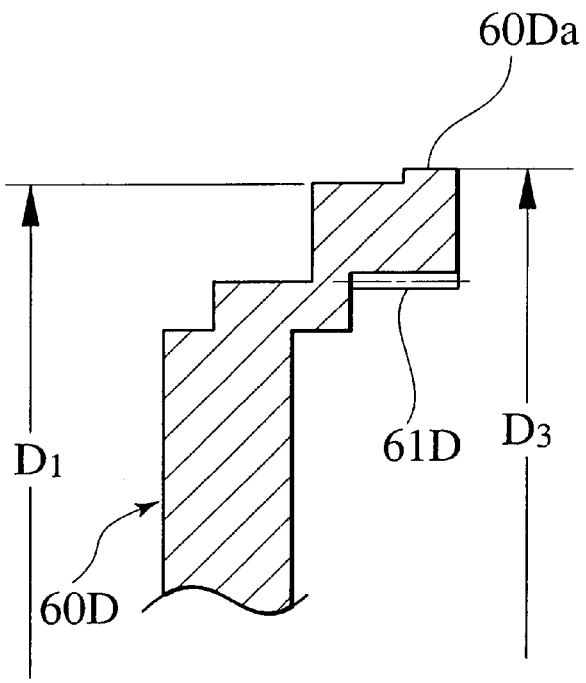
FIG. 30 is an explanatory sectional view of a lid according to the fifth embodiment of the invention.
Figure 31:
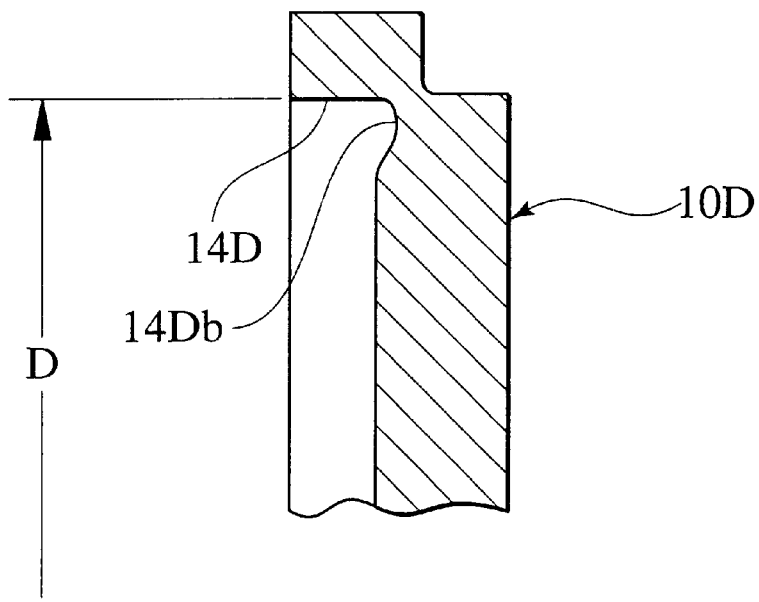
FIG. 31 is an explanatory sectional view of a frame.
Figure 32:
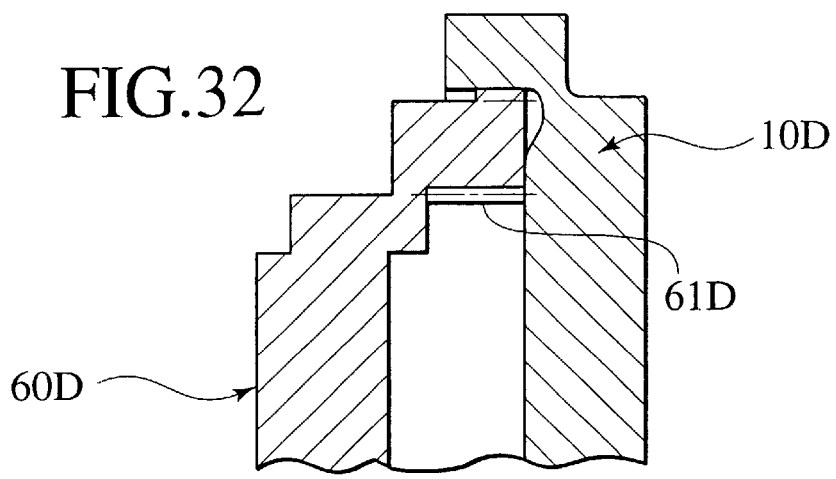
FIG. 32 is an explanatory sectional view showing a lid attached to a frame.
Figure 33:
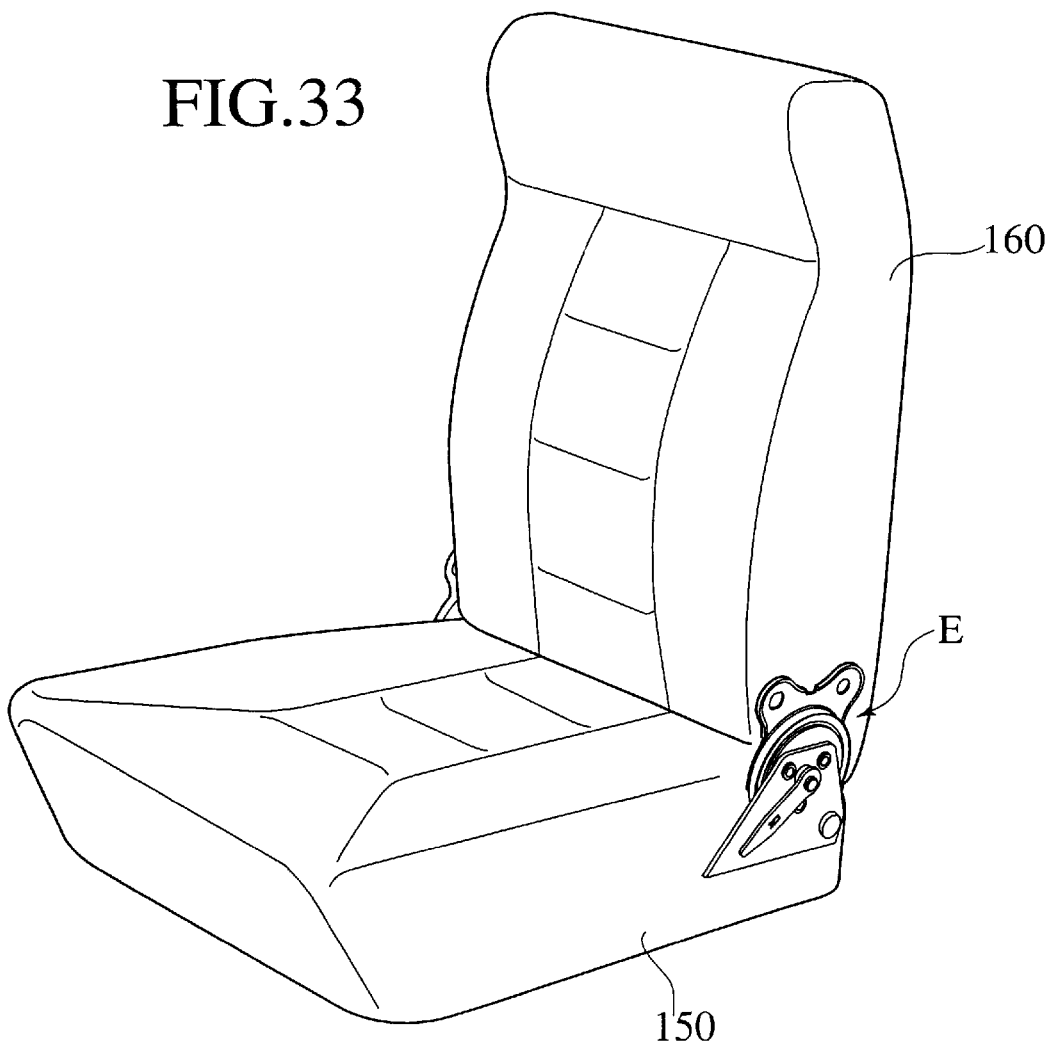

The embodiment is explained with reference to FIGS. 30 to 32. Elements in common with the constitution elements of the fourth embodiment are attached with the same characters to save their explanations.

The embodiment has four projections 60Da projecting radially outward, formed on the outer circumferential face of lid 60D at an interval of, for example, 90 degrees, respectively, with projections 60Da of outer diameter of D3 being larger than circular recess 14D of the inner diameter of D, formed to frame 10D.

When the inner side of circular recess 14D of frame 10D is assembled with the outer circumferential face of lid 60D, shaving the inner side of circular recess 14D of frame 10D with the projections 60Da, lid 60D is forced to be inserted. The rotation of lid 60D relative to frame 10D causes the shaving of circular recess 14D over all its inner circumferential face, thus effectively minimizing the looseness between the inner circumferential face and projections 60Da, and smoothing the rotation of lid 60D relative to frame 10D.

The entire contents of Japanese Patent Applications P2000-196759, P2000-196755, P2000-196837, and P2000-196857 (all filed Jun. 29, 2000) are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. A reclining device comprising:

a frame having a pivot protruding therefrom, the frame being fixed to a first seat component;

a first gear rotatable relative to the frame, the first gear being fixed to a second seat component for establishing an angle between the first seat component and the second seat component;

a cam rotatable to the first gear and with an input component; and a second gear driven by the cam for rotating on the pivot to lock with the first gear, wherein the pivot has smaller strength than the first gear and the second gear, so that the pivot is deformed radially outward by the second gear under a predetermined load to mesh with the first gear, with the first and second gears locked with each other so as to prevent rotation of the first gear.

2. A reclining device according to claim 1, wherein the frame has a first guide protruding therefrom, the first guide engages with a periphery of the second gear for guiding the second gear to be rotated on the pivot, and the first guide has smaller strength than the first gear and the second gear, wherein the first guide is deformed radially outward by the second gear under a predetermined load to mesh with the first gear, with the first and second nears locked with each other so as to prevent rotation of the first gear.

3. A reclining device according to claim 1, wherein the second gear has a rotational center inside and in proximity to a first tooth of the first gear.

4. A reclining device comprising:

a frame having a pivot protruding therefrom, the frame being fixed to a first seat component;

a first gear rotatable relative to the frame, the first gear being fixed to a second seat component for establishing an angle between the first seat component and the second seat component;

a cam rotatable to the first gear and with an input component; and a second gear driven by the cam for rotating on the pivot to lock with the first gear, wherein the second gear has a rotation center inside and in proximity to a first tooth of the first gear, wherein the second gear has a second tooth formed close to the pivot, wherein the second tooth has smaller whole depth in proximity to the rotation center than at another portion.

5. A reclining device according to claim 4, wherein the second gear has a second tooth to be meshed with the first tooth, and one of the first tooth and the second tooth has a pressure angle set at a range between 60 and 90 degrees.

6. A reclining device according to claim 4, wherein the second tooth has a tip circle with greater radius in proximity to the rotation center than at another portion.

7. A reclining device according to claim 4, wherein the frame comprises a first guide protruding therefrom, the first guide engaging with a periphery of the second gear for guiding the second gear to be rotated on the pivot.

8. A reclining device according to claim 1, further comprising:

a first lock mechanism for locking between the pivot and the first gear, when a load more than a predetermined value is applied to one of the frame and the first gear.

9. A reclining device according to claim 8, wherein the first locking mechanism comprises:

a first tooth formed to the first gear; and a first portion formed to the pivot and facing the first tooth, the first portion being deformed to mesh the first tooth.

10. A reclining device according to claim 2, further comprising:

a second lock mechanism for locking between the first guide and the first gear, when a load more than a predetermined value is applied to one of the frame and the first gear.

11. A reclining device according to claim 10, wherein the locking mechanism comprises:

a first tooth formed to the first gear; and a second portion formed to the first guide and facing the first tooth, the second portion being deformed to mesh the first tooth.

* * * * *